(12) United States Patent
Uno et al.

(10) Patent No.: US 11,811,088 B2
(45) Date of Patent: Nov. 7, 2023

(54) SEPARATOR, ELECTRODE GROUP, SECONDARY BATTERY, BATTERY PACK, VEHICLE, AND STATIONARY POWER SUPPLY

(71) Applicant: Kabushiki Kaisha Toshiba, Minato-ku (JP)

(72) Inventors: Wataru Uno, Yokohama (JP); Yasuyuki Hotta, Ota (JP); Shinsuke Matsuno, Minato (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 24 days.

(21) Appl. No.: 16/883,331

(22) Filed: May 26, 2020

(65) Prior Publication Data

US 2021/0091358 A1    Mar. 25, 2021

(30) Foreign Application Priority Data

Sep. 19, 2019  (JP) .............. JP2019-170920
May 18, 2020  (JP) .............. JP2020-086640

(51) Int. Cl.
*H01M 50/446* (2021.01)
*H01M 50/449* (2021.01)

(52) U.S. Cl.
CPC ....... *H01M 50/446* (2021.01); *H01M 50/449* (2021.01)

(58) Field of Classification Search
None
See application file for complete search history.

(56) References Cited

U.S. PATENT DOCUMENTS

| | | | | |
|---|---|---|---|---|
| 3,625,770 | A * | 12/1971 | Arrance | H01M 50/431 429/251 |
| 6,366,055 | B1 * | 4/2002 | Ookoshi | H02J 7/1423 320/132 |
| 7,279,251 | B1 | 10/2007 | Yun et al. | |
| 2005/0079424 | A1 * | 4/2005 | Davis | H01M 50/451 429/247 |
| 2008/0044728 | A1 * | 2/2008 | Schmidt | H01M 4/485 429/231.1 |
| 2010/0133023 | A1 * | 6/2010 | Tang | B60K 7/0007 180/65.1 |
| 2012/0251891 | A1 | 10/2012 | Li et al. | |
| 2014/0234726 | A1 | 8/2014 | Christensen et al. | |
| 2014/0322615 | A1 * | 10/2014 | Uehara | H01M 4/525 429/327 |
| 2015/0111110 | A1 | 4/2015 | Watanabe et al. | |
| 2015/0171398 | A1 * | 6/2015 | Roumi | G01R 31/3828 324/426 |
| 2015/0372309 | A1 | 12/2015 | Yachi et al. | |
| 2016/0093860 | A1 * | 3/2016 | Miyazaki | H01M 50/409 264/129 |
| 2016/0204406 | A1 * | 7/2016 | Ryu | H01M 50/411 429/144 |
| 2016/0351971 | A1 * | 12/2016 | Kim | H01M 50/20 |
| 2017/0069888 | A1 * | 3/2017 | Uchida | H01M 10/6563 |
| 2017/0222272 | A1 * | 8/2017 | Takami | H01M 4/5825 |
| 2017/0271682 | A1 | 9/2017 | Matsuno et al. | |
| 2017/0271717 | A1 | 9/2017 | Yamashita et al. | |
| 2018/0083321 | A1 | 3/2018 | Hotta et al. | |
| 2018/0277813 | A1 | 9/2018 | Yoshima et al. | |
| 2018/0277899 | A1 | 9/2018 | Takami et al. | |
| 2019/0088927 | A1 * | 3/2019 | Kusama | H01M 50/414 |
| 2019/0089012 | A1 | 3/2019 | Hotta et al. | |
| 2019/0288327 | A1 * | 9/2019 | Yamashita | H01M 4/485 |
| 2019/0288332 | A1 | 9/2019 | Hotta et al. | |
| 2021/0083251 | A1 | 3/2021 | Hotta et al. | |
| 2021/0359375 | A1 * | 11/2021 | Lim | H01M 50/403 |

FOREIGN PATENT DOCUMENTS

| | | | |
|---|---|---|---|
| CN | 106058124 | * | 10/2016 |
| JP | H-05-054874 | A | 3/1993 |
| JP | H 06-295718 | A | 10/1994 |
| JP | 11-329438 | A | 11/1999 |
| JP | 2005-243342 | A | 9/2005 |
| JP | 2005-268006 | A | 9/2005 |
| JP | 2005-285688 | A | 10/2005 |
| JP | 2013-232284 | A | 11/2013 |
| JP | 2014-207059 | A | 10/2014 |
| JP | 2015-32535 | A | 2/2015 |
| JP | 2015-084318 | A | 4/2015 |
| JP | 2016-512649 | A | 4/2016 |
| JP | 2016-164858 | A | 9/2016 |
| JP | 2016-173956 | A | 9/2016 |
| JP | 2018-147769 | * | 9/2018 |
| JP | 2018-198131 | A | 12/2018 |

(Continued)

OTHER PUBLICATIONS

Machine translation of CN 106058124, published on Oct. 26, 2016 (Year: 2016).*
Machine translation of JP2018-147769, published on Sep. 20, 2018 (Year: 2018).*
Liu, S. et al., "Rechargeable Aqueous Lithium-Ion Battery of $TiO_2/LiMn_2O_4$ with a High Voltage," Journal of The Electrochemical Society, vol. 158, No. 12, 2011, pp. A1490-A1497.

*Primary Examiner* — Anca Eoff
(74) *Attorney, Agent, or Firm* — Oblon, McClelland, Maier & Neustadt, L.L.P.

(57) ABSTRACT

A separator includes an inorganic particle layer including an inorganic particle, a polymeric binder and a fiber substance. A mass ratio of the fiber substance with respect to a total mass of the inorganic particle, the polymeric binder and the fiber substance is 0.1 mass % or more and 40 mass % or less.

14 Claims, 6 Drawing Sheets

(56) References Cited

FOREIGN PATENT DOCUMENTS

| | | |
|---|---|---|
| JP | 2019-057358 A | 4/2019 |
| WO | WO 01/89022 A1 | 11/2001 |
| WO | WO 2014/115852 A1 | 7/2014 |

\* cited by examiner

SEPARATOR, ELECTRODE GROUP, SECONDARY BATTERY, BATTERY PACK, VEHICLE, AND STATIONARY POWER SUPPLY

CROSS-REFERENCE TO RELATED APPLICATIONS

This application is based upon and claims the benefit of priority from Japanese Patent Application No. 2019-170920 filed on Sep. 19, 2019 and Japanese Patent Application No. 2020-086640 filed on May 18, 2020, and the entire contents of which are incorporated herein by reference.

FIELD

Embodiments relate generally to a separator, an electrode group, a secondary battery, a battery pack, a vehicle, and a stationary power supply.

BACKGROUND

A nonaqueous electrolyte battery such as a lithium ion secondary battery has been used as a power supply in a wide range of fields.

The nonaqueous electrolyte battery has a wide variety of forms, from a small form for various electronic devices and the like to a large form for electric cars and the like.

The nonaqueous electrolyte battery includes a negative electrode containing a negative electrode active material, a positive electrode containing a positive electrode active material, a separator, and a nonaqueous electrolyte. As the negative electrode active material, for example, a carbon material or lithium titanium oxides are used. As the positive electrode active material, for example, layered oxides containing nickel, cobalt, manganese, or the like are used. As the separator, for example, a porous film made of a resin or a nonwoven fabric is used.

As the nonaqueous electrolyte, a liquid nonaqueous electrolyte in which an electrolyte salt is dissolved in a nonaqueous solvent, can be used. As the nonaqueous solvent, for example, a mixture of ethylene carbonate and methyl ethyl carbonate or the like is used.

The nonaqueous electrolyte has a high oxidation resistance and a reduction resistance, and is unlikely to cause electrolysis of the solvent. Therefore, the nonaqueous electrolyte battery can realize high electromotive force and excellent charge/discharge performance. However, since most of the nonaqueous solvent is a combustible material, various measures for improving safety are required for the nonaqueous electrolyte battery.

On the other hand, examples of a battery using an aqueous electrolyte in which an electrolyte salt is dissolved in an aqueous solvent include a nickel-hydrogen battery and a lead storage battery. The aqueous solvent is generally a non-combustible material. Therefore, when the aqueous electrolyte is used, a battery having higher safety can be obtained as compared with the case in which the nonaqueous electrolyte is used.

However, water contained in the aqueous solvent has a narrower potential window for electrolysis, as compared with the nonaqueous solvent. Therefore, the aqueous electrolyte battery has a problem of a low charge/discharge efficiency due to the electrolysis of water.

DETAILED DESCRIPTION

Figure 1A:
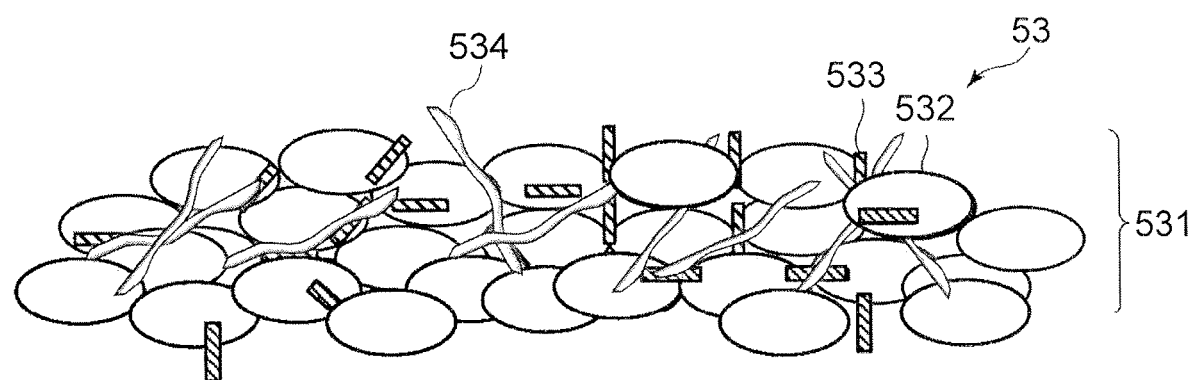
FIGS. 1A and 1B are cross-sectional views illustrating a separator according to a first embodiment.

Hereinafter, embodiments will be described with reference to the drawings. Those denoted by the same reference numerals indicate that they correspond to each other. The drawings are schematic or conceptual, and the relationship between a thickness and a width of each part, a size ratio between the parts, and the like are not necessarily the same as actual ones. Further, even when the same parts are represented, dimensions and a ratio to each other may be represented differently depending on drawings. In the following description, pH indicates a value at 25° C. and 1 atmospheric pressure (air) unless otherwise specified.

First Embodiment

Figure 1B:
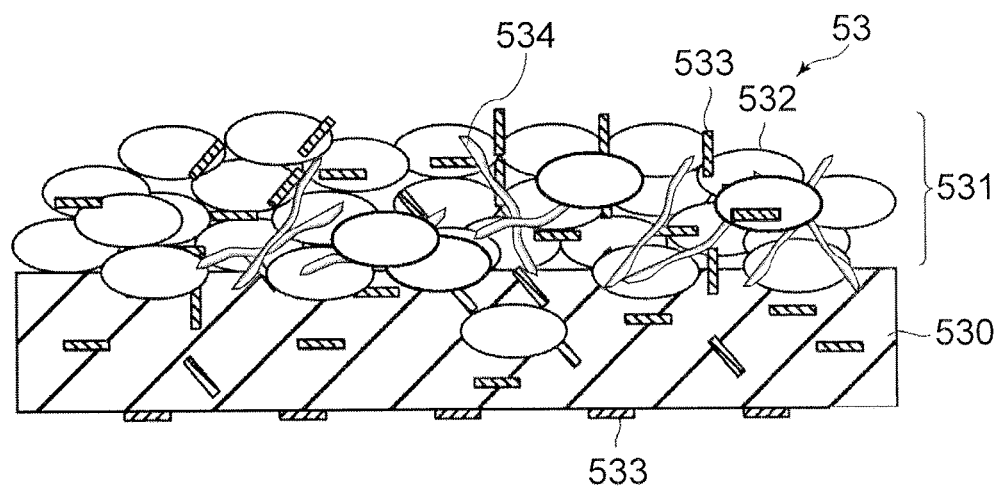

FIG. 1 is cross-sectional views illustrating a separator according to a first embodiment. A separator 53 illustrated in FIG. 1A includes an inorganic particle layer 531, and the inorganic particle layer 531 includes a fiber substance 534, inorganic particles 532, and a polymeric binder 533. The polymeric binder 533 is present in a gap between the inorganic particles 532. The separator 53 illustrated in FIG. 1B includes the inorganic particle layer 531 and a porous free-standing film (porous self-supporting film) 530. The polymeric binder 533 is included in a porous free-standing film 530 side as well as the inorganic particle layer 531. The fiber substance 534 and the polymeric binder 533 are present in the inorganic particle layer 531. The polymeric binder 533 bonds the inorganic particles 532 together or the inorganic particles 532 and the fiber substance 534. The separator according to the first embodiment includes the inorganic particles, the polymeric binder, and the fiber substance, in which a mass ratio of the fiber substance with respect to a total mass of the inorganic particles, the polymeric binder, and the fiber substance is 0.1 mass % or more and 40 mass % or less (0.1% by mass or more and 40% by mass or less).

The mass ratio of the fiber substance with respect to the total mass of the inorganic particles, the polymeric binder, and the fiber substance can be represented as {mass of fiber substance+(mass of inorganic particles+mass of polymeric binder+mass of fiber substance)}×100. The inorganic particles are preferably a ceramic having an alkali ion conductivity such as a lithium ion conductivity, but may be mixed with insulating metal oxides. In the case of FIG. 1B, a mass ratio of the fiber substance with respect to a total mass of the inorganic particles, the polymeric binder, and the fiber substance is 0.1 mass % or more and 40 mass % or less in the separator body excluding the self-standing film.

In the secondary battery including a solvent containing water as a solvent, water contained in the solvent of the aqueous electrolyte can be undesirably electrolyzed inside a negative electrode and in the vicinity of the negative electrode, during initial charge. This is because a potential of the negative electrode is decreased due to adsorption of lithium ions in a negative electrode active material, during the initial charge. When the negative electrode potential is lower than a hydrogen generation potential, water is partially decomposed into hydrogen ($H_2$) and a hydroxide ion ($OH^-$) inside the negative electrode and in the vicinity of the negative electrode. Thus, a pH of the aqueous electrolyte present inside the negative electrode and in the vicinity of the negative electrode is increased.

The hydrogen generation potential of the negative electrode depends on the pH of the aqueous electrolyte. That is, when the pH of the aqueous electrolyte in contact with the negative electrode is increased, the hydrogen generation potential of the negative electrode is decreased. Therefore, decomposition of water is unlikely to occur in the negative electrode, after the initial charge.

For the separator according to the present embodiment, a mixture of the inorganic particles, the polymeric binder, and the fiber substance is used. Therefore, the separator has a property of allowing alkali metal ions such as lithium ions to pass through, but the aqueous solvent is difficult to pass through. Therefore, in the secondary battery including the separator according to the first embodiment, the separator is positioned at least between the negative electrode and the positive electrode, and thus, it is difficult for the solvent included in the aqueous electrolyte in contact with the negative electrode and the solvent included in the aqueous electrolyte in contact with the positive electrode to go back and forth therebetween. Therefore, in the secondary battery according to the first embodiment, the pH of the aqueous electrolyte in contact with the negative electrode can be maintained in a high state. Accordingly, in the secondary battery including the separator according to the first embodiment, electrolysis of water in the negative electrode is suppressed, and a high charge/discharge efficiency, that is, a long life can be realized.

The separator according to the present embodiment includes the fiber substance, thereby decreasing a resistance of the separator and improving ion conductivity. This is presumed to be due to the fact that the aqueous electrolyte is taken in between the fiber substances included in the separator, thereby improving ion mobility of ions passing through the separator. The aqueous electrolyte is taken in the separator and the ion mobility is improved, whereby an interfacial resistance generated between the inorganic particles can be suppressed. The aqueous electrolyte being taken in between fibers of the fiber substance included in the separator may be, hereinafter referred to as swelling. Even in the case in which the separator swells, an average fiber diameter of the fiber substance hardly changes.

As such, the aqueous electrolyte is taken in between the fibers of the fiber substance, whereby the secondary battery including the separator according to the first embodiment can realize a low resistance. By lowering a resistance of the separator of the secondary battery and the secondary battery, charge/discharge operations at a high rate during charge/discharge can be realized, and further, an internal resistance of the secondary battery can be decreased. As such, the secondary battery having a decreased resistance can realize a high charge/discharge efficiency, that is, a long life. As described above, the secondary battery including the separator according to the first embodiment can realize a low resistance and a long life characteristic.

Further, by providing the separator according to the present embodiment, it is possible to suppress movement of water and internal short circuit between the positive electrode and the negative electrode and it is also possible to increase an energy density due to a decreased thickness.

By providing the separator according to the present embodiment, a ratio of the polymeric binder in the separator is increased while the resistance of the separator is suppressed, whereby a flexibility can be imparted to the separator, that is, mechanical strength can be also improved.

<Separator>

The separator according to the first embodiment will be described in detail. The separator has an electrical insulation property, and prevents the negative electrode and the positive electrode from being brought into contact with each other to cause internal short circuit. The separator is disposed at least between the positive electrode and the negative electrode. The separator is preferably in contact with the negative electrode, and more preferably in contact with both the positive electrode and the negative electrode. It is preferred that the separator is positioned so as to cover a main surface of the negative electrode. Further, it is preferred that the separator also covers one or more side surfaces, in addition to the main surface of the negative electrode. By employing such a configuration, a negative electrode side and a positive electrode side can be more accurately separated in the secondary battery, and the electrolysis of water can be more suppressed. The secondary battery according to the first embodiment may include a plurality of separators. In this case, the negative electrode and the positive electrode can be positioned between the separators, respectively.

The fiber substance included in the separator preferably has a hydroxyl group, a sulfone group, or a carboxyl group which is a hydrophilic functional group, and examples thereof include cellulose fibers, polysaccharides, polyvinyl alcohol, polyacrylic acid, anionic derivatives of polystyrene such as polystyrene sulfonate, cationic derivatives of polystyrene such as polystyrene trialkylbenzylammonium, and derivatives and copolymers thereof. Among these, cellulose fibers are preferred. The fiber substance may be used alone or in combination of two or more. Since the fiber substance as such has a hydroxyl group, a sulfone group, or a carboxyl group which is an electronegative functional group, an electrolyte is taken in between the fiber substances, thereby making the separator swell.

The mass ratio of the fiber substance with respect to the total mass of the inorganic particles, the polymeric binder, and the fiber substance included in the separator is preferably 0.1 mass % or more and 40 mass % or less. When the mass ratio of the fiber substance is within the range, the aqueous electrolyte is easily taken in between the fiber substances, a lower resistance of the separator can be realized, and a secondary battery having a long life can be realized by maintaining mechanical strength of the separator. When the mass ratio of the fiber substance is less than 0.1 mass, an amount of the fiber substance is small, and thus, it is difficult to take in the aqueous electrolyte between the fiber substances, and it is difficult to decrease the resistance of the separator. When the mass ratio of the fiber substance is more than 40 mass %, the fiber substance is excessively taken in to the separator, and thus, the resistance can be decreased, but the mechanical strength of the separator is decreased, and the life characteristic of the secondary battery is deteriorated. The mass ratio of the fiber substance is more preferably 0.5 mass % or more and 30 mass % or less, and still more preferably 1 mass % or more and 20 mass % or less. When the mass ratio of the fiber substance is within the range, the aqueous electrolyte is taken in between the fiber substances without losing the mechanical strength of the separator, whereby the lower resistance of the separator and a long life characteristic by maintaining the mechanical strength of the separator can be realized.

The mass ratio of the fiber substance, a mass ratio of the inorganic particles, and a mass ratio of the polymeric binder with respect to the total mass of the inorganic particles, the polymeric binder, and the fiber substance can be calculated, for example, by the following method.

First, the secondary battery is disassembled and the separator is collected. Next, the separator is partially cut to obtain a specimen. The size of the specimen is, for example, a square plate having a side length of 2 cm. The specimen is well dried in advance, for example, under a condition such as 50° C. in the atmosphere. Next, the specimen is mixed with a sufficient amount of a solvent. As the solvent, a solvent which can dissolve the polymeric binder without dissolving the inorganic particles and the fiber substance, is used. For dissolving polyvinyl butyral (PVB) as the polymeric binder, for example, N-methyl-2-pyrrolidone (NMP) or the like can be used. After dissolving the polymeric binder, a solid content and the solvent in which the fiber substance has been melted are separated, using a centrifuge. At this time, the solid content includes the inorganic particles and the fiber substance, and the solution includes the solvent and the polymeric binder. The solid content is dried well and then subjected to thermal gravimetric analysis (TG), thereby obtaining the mass of the inorganic particles and the polymeric binder included in the solid content.

On the other hand, the solution is subjected to thermal gravimetric analysis (TG), thereby obtaining the mass of the solvent and the polymeric binder included in the solution. From the mass obtained above, the mass ratio of the fiber substance, the mass ratio of the inorganic particles, and the mass ratio of the polymeric binder with respect to a sum of the inorganic particles, the polymeric binder, and the fiber substance can be obtained.

When a composite electrolyte layer is provided on a porous free-standing film as shown in FIG. 1B, a nonwoven fabric is stripped off from the separator using a spatula, and then a mass of the separator is weighed by, for example, an electronic balance and mixed with a sufficient amount of pure water. Next, after collecting a filtrate by filtration, pure water contained in the filtrate is evaporated, and the residue is subjected to thermal gravimetric analysis (TG).

An average fiber diameter of the fiber substance is preferably 100 nm or less, and more preferably 30 nm or less, from the viewpoint of swelling the separator. A lower limit of the average fiber diameter of the fiber substance is not particularly limited, but the average fiber diameter of the fiber substance is, for example, preferably 0.1 nm or more, and more preferably 1 nm or more. An average fiber length of the fiber substance is not particularly limited, but the fiber substance of 0.1 µm or more and 100 µm or less can be used.

The average fiber diameter of the fiber substance can be measured by, for example, observation by a scanning electron microscope (SEM). The manufactured secondary battery is disassembled and the separator is collected. The separator is dried well in advance, for example, under a condition such as 50° C. in the atmosphere. A surface of the dried separator was subjected to a gold sputtering treatment, and then observed by SEM. A fiber diameter of the fiber substance which can be seen in an SEM photograph is measured at 10 points, and an average thereof is calculated as the average fiber diameter. The average fiber length of the fiber substance can also be measured in the same manner as the average fiber diameter.

The inorganic particles, the polymeric binder, and the fiber substance included in the separator according to the first embodiment will be described in detail.

<Inorganic Particle>

The inorganic particles included in the separator are a compound containing at least one cations selected from the group consisting of the following element group: Mg, Al, Si, Ca, Sc, Ti, V, Cr, Mn, Fe, Co, Ni, Cu, Zn, Ga, Ge, Sr, Y, Zr, Nb, Mo, Ru, Rh, Pd, Ag, In, Ba, Hf, Ta, W, Re, Ir, Pt, and Au. Examples of the compound include oxides, sulfide, hydroxides, carbonates, and sulfates, but are not limited thereto.

The inorganic particles are preferably inorganic solid electrolyte having excellent alkali ion conductivity. Further, the inorganic particles preferably have high water resistance. This is because it is difficult for hydrolysis to occur in the secondary battery. The inorganic particles are for example, an inorganic solid electrolyte having excellent lithium ion conductivity and have a NASICON-type structure, and examples thereof include a lithium phosphate solid electrolyte represented by a general formula of $LiM_2(PO_4)_3$. In the general formula, M is preferably at least one element selected from the group consisting of titanium (Ti), germanium (Ge), strontium (Sr), zirconium (Zr), tin (Sn), and aluminum (Al). The element M more preferably includes any one of Ge, Zr, and Ti and Al.

Specific examples of the lithium phosphate solid electrolyte having an NASICON-type structure include LATP $(Li_{1+x}Al_xTi_{2-x}(PO_4)_3)$, $Li_{1+x}Al_xGe_{2-x}(PO_4)_3$, and $Li_{1+x}Al_xZr_{2-x}(PO_4)_3$. In the above formula, x is in a range of $0<x\leq5$, and preferably in a range of $0.1\leq x\leq0.5$. As the solid electrolyte, it is preferred to use LATP. LATP has excellent water resistance and is less likely to cause hydrolysis in the secondary battery.

As an oxide-based solid electrolyte, amorphous LIPON $(Li_{2.9}PO_{3.3}N_{0.46})$ or LLZ $(Li_7La_3Zr_2O_{12})$ having a garnet-type structure may be used. The inorganic solid electrolyte may be used alone or in combination of two or more.

As the inorganic particles, a solid electrolyte conducting sodium ions may be used. A sodium-containing solid electrolyte has excellent ion conductivity of sodium ions. Examples of the sodium-containing solid electrolyte include sodium phosphorus sulfides, sodium phosphates, and the like. A sodium ion-containing solid electrolyte is preferably in the form of a glass ceramic.

Examples of the inorganic particles include, but are not particularly limited to, ceramics based on oxides such as alumina, silica, zirconia, yttria, magnesium oxide, calcium oxide, barium oxide, strontium oxide, and vanadium oxide, carbonates and sulfates such as sodium carbonate, potassium carbonate, magnesium carbonate, calcium carbonate, barium carbonate, lanthanum carbonate, cerium carbonate, calcium sulfate, magnesium sulfate, aluminum sulfate, gypsum, and barium sulfate, phosphates such as hydroxyapatite, zirconium phosphate, and titanium phosphate, and ceramics based on nitrides such as silicon nitride, titanium nitride, and boron nitride. The inorganic particles described above may be in the form of a hydrate.

The inorganic particles alumina ($Al_2O_3$), silica ($SiO_2$), and calcium oxide (CaO) are preferably in the form of glass ceramics. The metal oxides may be used alone or in combination of two or more. As the inorganic particles, a mixture of the inorganic solid electrolyte and the metal oxide may be used.

A shape of the inorganic particles is not particularly limited, but may be, for example, spherical, elliptical, flat, fibrous, or the like. An average particle size of the inorganic particles is preferably 100 μm or less, more preferably 70 μm or less, and still more preferably 50 μm or less, from the viewpoint of increasing an alkali metal ion conductivity. A lower limit of the average particle size of the inorganic particles is not particularly limited, but according to an example, is 0.05 μm or more.

The average particle size of the inorganic particles means a particle size at which a volume integrated value is 50%, in a particle size distribution determined by a laser diffraction type particle size distribution measuring device. As a sample for measuring the particle size distribution, a dispersion solution diluted with ethanol so that a concentration of the inorganic particles is 0.01 mass % or more and 5 mass % or less, is used.

A bulk or grain boundary of the inorganic particles included in the separator, or the aqueous electrolyte infiltrated in the separator can be passed through by monovalent cations. Examples of the monovalent cation include alkali metal ions such as a lithium ion, a sodium ion, and a potassium ion. On the other hand, in the separator, the aqueous electrolyte is taken in between the fiber substances, so that the separator swells, whereby it is difficult for the solvent of the aqueous electrolyte to pass through the separator. That is, though a solvated alkali metal ion can infiltrate the separator, the solvated alkali metal ion can be desolvated and pass through the separator.

A ratio of the inorganic particles in the separator is typically 40 mass % or more and 90 mass % or less, for example, 45 mass % or more and 85 mass % or less.

The inorganic particles are preferably a main component of the separator. A ratio of the inorganic particles in the separator is preferably 60 mass % or more, more preferably 70 mass % or more, and still more preferably 80 mass % or more, from the viewpoint of densifying the separator to increase a water shielding property. When the ratio of the inorganic particles in the separator is less than 60 mass %, the water shielding property is decreased.

The ratio of the inorganic particles in the separator is preferably 94 mass % or less, more preferably 92 mass % or less, and still more preferably 90 mass % or less, from the viewpoint of increasing flexibility of the separator. When the ratio of the inorganic particles in the separator is more than 94 mass %, a ratio of the polymeric binder is decreased to less than 6 mass %, whereby the flexibility is decreased, cracks and the like enter the separator, and battery performance is deteriorated.

The ratio of the inorganic particles in the entire separator can be calculated by thermal gravimetric analysis (TG).

<Polymeric Binder>

The polymeric binder included in the separator is configured as follows. A weight average molecular weight of the polymeric binder is, for example, 3000 or more. When the weight average molecular weight of the polymeric binder is 3000 or more, a binding property of the inorganic particles is further increased. The weight average molecular weight of the polymeric binder is preferably 3000 or more and 5000000 or less, more preferably 5000 or more and 2000000 or less, and still more preferably 10000 or more and 1000000 or less. The weight average molecular weight of the polymeric binder can be determined by gel permeation chromatography (GPC).

The polymeric binder may be a polymer formed of a single monomer unit, a copolymer formed of a plurality of monomer units, or a mixture thereof. It is preferred that the polymeric binder includes a monomer unit composed of a hydrocarbon having a functional group containing one or two or more elements selected from the group consisting of oxygen (O), sulfur (S), nitrogen (N), and fluorine (F). In the polymeric binder, a ratio of a part composed of the monomer unit is preferably 70 mol % or more. Hereinafter, the monomer unit is referred to as a first monomer unit. In the copolymer, those other than the first monomer unit are referred to as a second monomer unit. The copolymer of the first monomer unit and the second monomer unit may be an alternating copolymer, a random copolymer, or a block copolymer.

In the polymeric binder, when the ratio of the part composed of the first monomer unit is less than 70 mol %, water easily passes through the separator, and as a result, a charge/discharge efficiency of a battery may be decreased. In the polymeric binder, the ratio of the part composed of the first monomer unit is preferably 90 mol % or more. It is most preferred that the polymeric binder has the ratio of the part composed of the first monomer unit of 100 mol %, that is, the polymeric binder is a polymer formed of only the first monomer unit.

The first monomer unit has a functional group containing one or two or more elements selected from the group consisting of oxygen (O), sulfur (S), nitrogen (N), and fluorine (F) in a side chain, and may be a compound having a main chain composed of a carbon-carbon bond. The hydrocarbon may have one or two or more functional groups containing one or two or more elements selected from the group consisting of oxygen (O), sulfur (S), nitrogen (N), and fluorine (F). The functional group in the first monomer unit increases a conductivity of alkali metal ions passing through the separator.

It is preferred that the hydrocarbon constituting the first monomer unit has a functional group containing one element selected from the group consisting of oxygen (O), sulfur (S), and nitrogen (N). When the first monomer unit has the functional group as such, the alkali metal ion conductivity in the separator tends to be further increased to decrease an internal resistance.

The functional group included in the first monomer unit is preferably at least one selected from the group consisting of a formal group, a butyral group, a carboxymethyl ester group, an acetyl group, a carbonyl group, a hydroxyl group, and a fluoro group. Further, the first monomer unit more preferably contains at least one of a carbonyl group and a hydroxyl group in the functional group, and more preferably contains both of them.

The first monomer unit can be represented by the following formula (Chemical Formula A).

[Chemical Formula A]

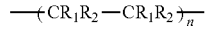

In the above formula, $R_1$ is preferably selected from the group consisting of hydrogen (H), an alkyl group, and an amino group. Further, $R_2$ is preferably selected from the group consisting of a hydroxyl group (—OH), —$OR_1$, —$COOR_1$, —$OCOR_1$, —$OCH(R_1)O$—, —CN, —$N(R_1)_3$, and —$SO_2R_1$. Examples of the first monomer unit include at least one or two or more selected from the group consisting of vinyl formal, vinyl alcohol, vinyl acetate, vinyl acetal, vinyl butyral, acrylic acid and derivatives thereof, methacrylic acid and derivatives thereof, acrylonitrile, acrylamide and derivatives thereof, styrene sulfonic acid, and tetrafluoroethylene.

The polymeric binder preferably includes at least one selected from the group consisting of polyvinyl formal, polyvinyl alcohol, polyvinyl acetal, polyvinyl butyral, polymethyl methacrylate, and polytetrafluoroethylene.

Hereinafter, an example of a structural formula of a compound which can be used as the polymeric binder will be described. The structural formula of polyvinyl formal is as follows (Chemical Formula B). In the following formula, it is preferred that a is 50 or more and 80 or less, b is 0 or more and 5 or less, and c is 15 or more and 50 or less.

[Chemical Formula B]

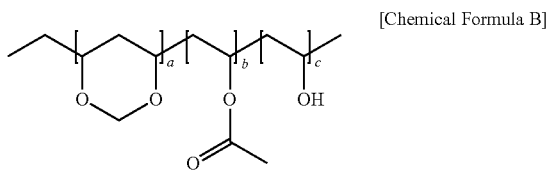

The structural formula of polyvinyl butyral is as follows (Chemical Formula C). In the following formula, it is preferred that 1 is 50 or more and 80 or less, m is 0 or more and 10 or less, and n is 10 or more and 50 or less.

[Chemical Formula C]

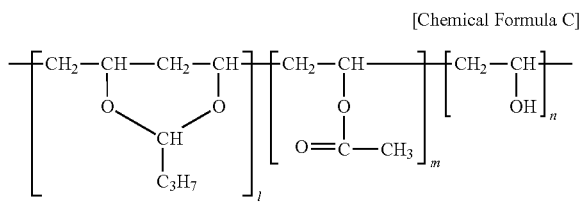

The structural formula of polyvinyl alcohol is as follows (Chemical Formula D). In the following formula, it is preferred that n is 70 or more and 20000 or less.

[Chemical Formula D]

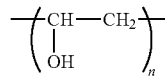

The structural formula of polymethyl methacrylate is as follows (Chemical Formula E). In the following formula, it is preferred that n is 30 or more and 10000 or less.

[Chemical Formula E]

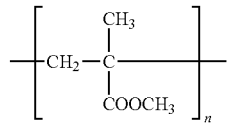

The second monomer unit is a compound other than the first monomer unit, that is, a compound having no functional group containing one or two or more elements selected from the group consisting of oxygen (O), sulfur (S), nitrogen (N), and fluorine (F), or a compound which has the functional group but is not a hydrocarbon. Examples of the second monomer unit include ethylene oxide and styrene. Examples of a polymer formed of the second monomer unit include polyethylene oxide (PEO) and polystyrene (PS).

The kind of functional groups included in the first monomer unit and the second monomer unit can be identified by infrared spectroscopic analysis (Fourier transform infrared spectroscopy; FT-IR). Further, the first monomer unit being formed of a hydrocarbon can be decided by nuclear magnetic resonance (NMR). Further, the ratio of the part composed of the first monomer unit in the copolymer of the first monomer unit and the second monomer unit can be calculated by NMR.

The polymeric binder can include the aqueous electrolyte. A ratio of the aqueous electrolyte which can be included in the polymeric binder can be grasped from a water absorption. Here, the water absorption of the polymeric binder is a value obtained by dividing a value obtained by subtracting a mass M of the polymeric binder before immersion from a mass M1 of the polymeric binder after being immersed in water at 23° C. for 24 hours by the mass M of the polymeric binder before immersion ([M1−M]/M×100). The water absorption of the polymeric binder is considered to be related to polarity of the polymeric binder.

When the polymeric binder having a high water absorption is used, the alkali metal ion conductivity of the separator tends to be increased. Further, when the polymeric binder having a high water absorption is used, a binding force between the inorganic particles and the polymeric binder is increased, so that the flexibility of the separator can be increased. The water absorption of the polymeric binder is preferably 0.01% or more, more preferably 0.5% or more, and still more preferably 2% or more.

When the polymeric binder having a low water absorption is used, a strength of the separator can be increased. That is, when the water absorption of the polymeric binder is too high, the polymeric binder of the separator may flow out into the aqueous electrolyte. The water absorption of the polymeric binder is preferably 15% or less, more preferably 10% or less, still more preferably 7% or less, and particularly preferably 3% or less.

The ratio of the polymeric binder in the separator is typically 5 mass % or more and 30 mass % or less, for example, 5 mass % or more and 20 mass % or less.

The ratio of the polymeric binder in the separator is preferably 1 mass % or more, more preferably 3 mass % or more, and still more preferably 10 mass % or more, from the viewpoint of increasing the flexibility of the separator.

Further, the ratio of the polymeric binder in the separator is preferably 50 mass % or less, more preferably 40 mass % or less, and still more preferably 30 mass % or less, from the viewpoint of increasing the lithium ion conductivity of the separator. The ratio of the polymeric binder in the entire separator can be calculated by thermal gravimetric analysis (TG).

The separator may include a plasticizer and an electrolyte salt, in addition to the inorganic particles, the fiber substance, and the polymeric binder. When the separator includes the electrolyte salt, the alkali metal ion conductivity of the separator can be further increased.

A ratio of the electrolyte salt in the separator is preferably 0.01 mass % or more and 10 mass % or less, and more preferably 0.05 mass % or more and 5 mass % or less. The ratio of the electrolyte salt in the separator can be calculated by thermal gravimetric analysis (TG).

Whether the separator includes the electrolyte salt can be confirmed by, for example, an alkali metal ion distribution obtained from energy dispersive X-ray spectrometry (EDX) on a separator cross section. That is, when the separator is formed of a material containing no electrolyte salt, the alkali metal ion remains on the surface of a polymer in the separator, and thus, is hardly present inside the separator. Therefore, a concentration gradient in which an alkali metal ion concentration is high on the surface of the separator and low inside the separator, can be observed. On the other hand, when the separator is formed of a material containing the electrolyte salt, it can be confirmed that the alkali metal ion is uniformly present inside the separator.

When the electrolyte salt included in the separator is a different kind from the electrolyte salt included in the aqueous electrolyte, it can be understood that the separator includes the electrolyte salt which is different from the aqueous electrolyte, depending on the kind of ions present. For example, when lithium chloride (LiCl) is used as the aqueous electrolyte and LiTFSl (lithium bis(fluorosulfonyl) imide) is used in the separator, presence of a (fluorosulfonyl) imide ion in the separator can be confirmed. On the other hand, in the aqueous electrolyte on a negative electrode side, presence of a (fluorosulfonylimide) ion cannot be confirmed or the (fluorosulfonylimide) ion exists only at a very low concentration.

As the electrolyte salt, a lithium salt, a sodium salt, or a mixture thereof is preferably used. The electrolyte salt can be used alone or in combination of two or more. As the lithium salt, for example, lithium chloride (LiCl), lithium bromide (LiBr), lithium hydroxide (LiOH), lithium sulfate ($Li_2SO_4$), lithium nitrate ($LiNO_3$), lithium acetate ($CH_3COOLi$), lithium oxalate ($Li_2C_2O_4$) lithium carbonate ($Li_2CO_3$), lithium bis (trifluoromethanesulfonyl)imide) (LiTFSI; $LiN(SO_2CF_3)_2$), lithium bis(fluorosulfonyl)imide (LiFSI; $LiN(SO_2F)_2$), and lithium bisoxalate borate (LiBOB:$LiB[(OCO)_2]_2$), and the like can be used.

Further, as the sodium salt, sodium chloride (NaCl), sodium sulfate ($Na_2SO_4$), sodium hydroxide (NaOH), sodium nitrate ($NaNO_3$), sodium trifluoromethanesulfonyl amide (NaTFSA), and the like can be used.

<Fiber Substance>

The fiber substance included in the separator preferably has a hydroxyl group, a sulfone group, or a carboxyl group which is a hydrophilic functional group, and examples thereof include cellulose fibers, polysaccharides, polyvinyl alcohol, polyacrylic acid, anionic derivatives of polystyrene such as polystyrene sulfonate, cationic derivatives of polystyrene such as polystyrene trialkylbenzylammonium, and derivatives and copolymers thereof. Among these, cellulose fibers are preferred. The fiber substance may be used alone or in combination of two or more. Since the fiber substance as such has a hydroxyl group, a sulfone group, or a carboxyl group which is an electronegative functional group, an electrolyte is taken in between the fiber substances, thereby making the separator swell.

An average fiber diameter of the fiber substance is preferably 100 nm or less, and more preferably 30 nm or less, from the viewpoint of swelling the separator. A lower limit of the average fiber diameter of the fiber substance is not particularly limited, but the average fiber diameter of the fiber substance is, for example, preferably 0.1 nm or more, and more preferably 1 nm or more. An average fiber length of the fiber substance is not particularly limited, but the fiber substance of 0.1 μm or more and 100 μm or less can be used.

The average fiber diameter of the fiber substance can be measured by, for example, observation by a scanning electron microscope (SEM). The manufactured secondary battery is disassembled and the separator is collected. The separator is dried well in advance, for example, under a condition such as 50° C. in the atmosphere. A surface of the dried separator was subjected to a gold sputtering treatment, and then observed by SEM. A fiber diameter of the fiber substance which can be seen in an SEM photograph is measured at 10 points, and an average thereof is calculated as the average fiber diameter. A method of measuring the average fiber length of the fiber substance can also be measured in the same manner as the average fiber diameter.

It is preferred that the separator has flexibility. When the separator has flexibility, it is difficult for defects such as cracks to occur in the separator. Therefore, when the separator having flexibility is used, a negative electrode side and a positive electrode side can be more accurately separated in the secondary battery, and the electrolysis of water can be more suppressed. A height of the flexibility of the separator may depend on the kind, the blending amount, or the like of the polymeric binder included in the separator.

A thickness of the separator is preferably 1 μm or more and 100 μm or less as a thickness of the inorganic particle layer. Within the range, an energy density of the secondary battery can be increased, and a mechanical strength can be maintained. When the thickness is less than 1 μm, the internal resistance of the secondary battery tends to be decreased and the volume energy density of the secondary battery tends to be increased, but it is difficult for the electrolyte to pass through, and thus, such thickness is not preferred. When the thickness is more than 100 μm, it is difficult for the aqueous solvent to pass through the separator and the life of secondary batteries can be increased, but the energy density is decreased. The thickness is more preferably 2 μm or more and 80 μm or less, and more preferably 5 μm or more and 60 μm or less. The thickness of the separator can be measured by, for example, SEM observation. That is, first, the secondary battery is disassembled and the separator is collected. The separator is dried well in advance, for example, under a condition such as 50° C. in the atmosphere. Next, the separator is partially cut to obtain a specimen. The size of the specimen is, for example, a square plate having a side length of 2 cm. The cross section of the obtained specimen is subjected to a gold sputtering treatment, and then the cross section of the specimen is observed with SEM, thereby obtaining a film thickness of the separator.

The separator can be used alone, but may be laminated or stacked on the surface of the porous free-standing film. This is, for example, a form illustrated in FIG. 1B. As the separator, the inorganic particle layer is laminated on the surface of the porous free-standing film, thereby increasing the mechanical strength. That is, the inorganic particle layer is laminated on the surface of the porous free-standing film, whereby it is possible to maintain the mechanical strength even with the thinned inorganic particle layer. The film thickness of the porous free-standing film is preferably 100 µm or less, more preferably 50 µm or less, and still more preferably 10 µm or less. When the inorganic particle layer according to the present embodiment and the porous free-standing film are used in a laminated state, the thickness of the separator on which the porous free-standing film is laminated is preferably 200 µm at maximum. Even in this case, the thickness of the inorganic particle layer is within the range of the thickness described above, and the thickness of the porous free-standing film is also within the range of the thickness described above.

The porous free-standing film is, for example, a porous film or a nonwoven fabric. As a material of the porous film or the nonwoven fabric, for example, polyethylene (PE), polypropylene (PP), cellulose, or polyvinylidene fluoride (PVdF) can be used. The porous film is preferably a nonwoven fabric made of cellulose.

The porous free-standing film can also be impregnated with a nonaqueous electrolyte. The porous free-standing film can also include the polymeric binder.

<Separator Manufacturing Method>

Next, a method of producing a separator will be described. First, the inorganic particles, the polymeric binder, the fiber substance, and a solvent are mixed to obtain a mixed solution. In the mixed solution, a mass ratio of the inorganic particles, the polymeric binder, and the fiber substance is preferably 49:49:2 to 96:2:2. The mass ratio is a ratio of a mass of each of the inorganic particles, the polymeric binder, and the fiber substance with respect to a total mass thereof. In addition, the electrolyte salt may be optionally added to the mixed solution. In this case, a mass ratio of the inorganic particles, the polymeric binder, the fiber substance and the electrolyte salt is preferably 50:40 to 96:2:2.

As the solvent, it is preferred to use a solvent which can dissolve the polymeric binder. Examples of the solvent include alcohols such as ethanol, methanol, isopropyl alcohol, normal propyl alcohol, and benzyl alcohol; ketones such as acetone, methyl ethyl ketone, methyl isobutyl ketone, cyclohexanone, and diacetone alcohol; esters such as ethyl acetate, methyl acetate, butyl acetate, ethyl lactate, methyl lactate, and butyl lactate; ethers such as methyl cellosolve, ethyl cellosolve, butylcellosolve, 1,4-dioxane, and tetrahydrofuran; glycols such as ethylene glycol monoethyl ether acetate, propylene glycol monomethyl ether acetate, butyl carbitol acetate, and ethyl carbitol acetate; glycolethers such as methyl carbitol, ethyl carbitol, and butyl carbitol; aprotic polar solvents such as dimethylformamide, dimethylacetamide, acetonitrile, valeronitrile, N-methyl-2-pyrrolidone, N-ethyl-2-pyrrolidone, and γ-butyrolactam; cyclic carboxylic acid esters such as gamma butyrolactone, gamma valerolactone, gamma caprolactone, and epsilon caprolactone; and chain carbonate compounds such as dimethyl carbonate, diethyl carbonate, di-n-propyl carbonate, diisopropyl carbonate, n-propyl isopropyl carbonate, ethyl methyl carbonate, and methyl-n-propyl carbonate.

Next, the mixed solution is sufficiently stirred using a disperser such as a ball mill to obtain a slurry. Then, after the slurry is poured into a mold, the solvent is removed by vacuum drying, whereby the separator including at least the inorganic particles, the fiber substance, and the polymeric binder can be obtained.

The separator can also be produced as follows, by application on the porous free-standing film. For example, the slurry is applied on a first main surface of the porous free-standing film by a doctor blade method.

The separator described above has a two-layer structure of the porous free-standing film and a layer including the inorganic particles. This is more preferred, since the mechanical strength of the separator can be increased, the thickness of the separator can be decreased, and the internal resistance inside the secondary battery can be decreased.

The separator according to the first embodiment includes an inorganic particle layer including inorganic particles, a polymeric binder, and a fiber substance, in which the mass ratio of the fiber substance with respect to the total mass of the inorganic particles, the polymeric binder, and the fiber substance is 0.1 mass % or more and 40 mass % or less.

By providing the fiber substance, the resistance of the separator can be decreased, the lithium ion conductivity can be improved, and movement of water can be suppressed by the inorganic particles. Therefore, the secondary battery including the separator according to the first embodiment can realize a low resistance and a long life characteristic.

Second Embodiment

Figure 2:
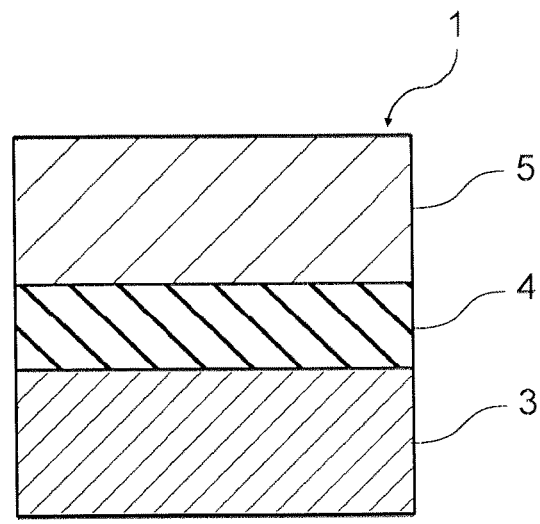
FIG. 2 is a schematic view of an electrode group according to a second embodiment.

An electrode group according to a second embodiment will be described using FIG. 2. FIG. 2 is a schematic view of the electrode group according to the second embodiment. An electrode group 1 includes a positive electrode 5, a negative electrode 3, and a separator 4 according to the first embodiment between the positive electrode and the negative electrode.

The positive electrode and the negative electrode included in the electrode group will be described in detail. Since the separator 4 has been described in the first embodiment, a description thereof will be omitted.

(Negative Electrode)

The negative electrode may include a negative electrode current collector and a negative electrode active material-containing layer supported on at least one main surface of the negative electrode current collector.

As a material of the negative electrode current collector, a material which is electrochemically stable in a negative electrode potential range when an alkali metal ion is inserted or desorbed, is used. It is preferred that the negative electrode current collector is, for example, an aluminum foil, or an aluminum alloy foil containing at least one element selected from the group consisting of magnesium (Mg), titanium (Ti), zinc (Zn), manganese (Mn), iron (Fe), copper (Cu), and silicon (Si). The negative electrode current collector may be another form such as a porous body or a mesh. A thickness of the negative electrode current collector is preferably 5 µm or more and 20 µm or less. The current collector having the thickness as such can balance the strength and the light weight of the electrode.

The negative electrode active material-containing layer contains the negative electrode active material. The negative electrode active material-containing layer may be supported on both main surfaces of the negative electrode current collector.

It is desirable that a porosity of the negative electrode active material-containing layer is 20% or more and 50% or less. This allows a high-density negative electrode having excellent affinity with the aqueous electrolyte to be obtained. It is more preferred that the porosity of the negative electrode active material-containing layer is 25% or more and 40% or less.

The porosity of the negative electrode active material-containing layer can be obtained by, for example, a mercury intrusion method. Specifically, first, a pore distribution of the active material-containing layer is obtained by the mercury intrusion method. Next, a total pore amount is calculated from the pore distribution. Then, the porosity can be calculated from a ratio of the total pore volume and a volume of the active material-containing layer.

A specific surface area of the negative electrode active material-containing layer in a BET method by nitrogen ($N_2$) adsorption is more preferably 3 $m^2/g$ or more and 50 $m^2/g$ or less. When the specific surface area of the negative electrode active material-containing layer is less than 3 $m^2/g$, affinity between the negative electrode active material and the aqueous electrolyte is lowered. As a result, an interface resistance of the negative electrode is increased, and an output property and a charge/discharge cycle property may be deteriorated. On the other hand, when the specific surface area of the negative electrode active material-containing layer is more than 50 $m^2/g$, a distribution of ion species ionized from the electrolyte salt is biased toward the negative electrode, resulting in insufficient ion species ionized from the electrolyte salt at the positive electrode, thereby deteriorating the output property and the charge/discharge cycle property.

The specific surface area can be determined by, for example, the following method. First, the secondary battery is disassembled to collect a part of the negative electrode active material-containing layer. Next, while a pressure, P (mmHg) of nitrogen gas is gradually increased in nitrogen gas at 77 K (boiling point of nitrogen), a nitrogen gas adsorption amount (mL/g) of a sample was measured at every pressure P. Next, a value obtained by dividing the pressure P (mmHg) by a saturated vapor pressure P0 (mmHg) of nitrogen gas is defined as a relative pressure P/P0, and the nitrogen gas adsorption amount for each relative pressure P/P0 is plotted to obtain an adsorption isotherm. Then, a BET plot is calculated from the nitrogen adsorption isotherm and the BET equation, and the BET plot is used to obtain the specific surface area. The BET plot is calculated using the BET multipoint method.

As the negative electrode active material, a compound having a lithium ion adsorption/desorption potential of 1 V (vs. Li/Li$^+$) or more and 3 V (vs. Li/Li$^+$) or less, as a potential based on metal lithium, can be used. That is, the secondary battery according to the embodiment can maintain the hydrogen generation potential of the negative electrode in a low state after an initial charge, as described above. Therefore, as the negative electrode active material of the secondary battery, a material having a relatively low lower limit of the lithium ion adsorption/desorption potential can be used. The use of the negative electrode active material as such can increase the energy density of the secondary battery. Therefore, the secondary battery can realize the same energy density as a battery using a non-aqueous electrolyte.

As the negative electrode active material, specifically, titanium oxides or titanium-containing oxides can be used. As the titanium-containing oxides, lithium titanium composite oxides, niobium titanium composite oxides, sodium niobium titanium composite oxides, and the like can be used. The negative electrode active material can include one or two or more titanium oxides and titanium-containing oxides.

The titanium oxides include, for example, titanium oxides having a monoclinic structure, titanium oxides having a rutile structure, and titanium oxides having an anatase structure. For the titanium oxides having each crystal structure, a composition before a charge can be represented by $TiO_2$ and a composition after a charge can be represented by $Li_xTiO_2$ (x is 0≤x≤1). Further, the structure of the titanium oxides having a monoclinic structure before a charge can be represented by $TiO_2$ (B).

The lithium titanium oxides include, for example, lithium titanium oxides having a spinel structure (for example, a general formula of $Li_{4+x}Ti_5O_{12}$ (x is −1≤x≤3)), lithium titanium oxides having a ramsdellite structure (for example, $Li_{2+x}Ti_3O_7$ (−1≤x≤3)), $Li_{1+x}Ti_2O_4$ (0≤x≤1), $Li_{1.1+x}Ti_{1.8}O_4$ (0≤x≤1), $Li_{1.07+x}Ti_{1.86}O_4$ (0≤x≤1), $Li_xTiO_2$ (0<x≤1), and the like. Further, the lithium titanium oxides may be lithium titanium composite oxides to which a foreign element is introduced.

The niobium titanium composite oxides include, for example, those represented by $Li_aTiM_bNb_{2±\beta}O_{7±\sigma}$ (0≤a≤5, 0≤b≤0.3, 0≤β≤0.3, 0≤σ≤0.3, M is at least one element selected from the group consisting of Fe, V, Mo, and Ta).

The sodium niobium titanium composite oxides include orthorhombic-type Na-containing niobium titanium composite oxides represented by a general formula of $Li_{2+v}Na_{2-w}M1_xTi_{6-y-z}Nb_yM2_zO_{14+\delta}$ (0≤v≤4, 0≤w<2, 0≤x<2, 0<y<6, 0≤z<3, −0.5≤δ≤0.5, M1 includes at least one selected from the group consisting of Cs, K, Sr, Ba, and Ca, and M2 includes at least one selected from the group consisting of Zr, Sn, V, Ta, Mo, W, Fe, Co, Mn, and Al).

As the negative electrode active material, it is preferred to use titanium oxides having an anatase structure, titanium oxides having a monoclinic structure, lithium titanium oxides having a spinel structure, or a mixture thereof. When these oxides are used as the negative electrode active material, a high electromotive force can be obtained, for example, by combining the oxides with lithium manganese composite oxides as the positive electrode active material.

The negative electrode active material is contained in the negative electrode active material-containing layer, for example, in the form of particles. The negative electrode active material particles may be primary particles, secondary particles which are an aggregate of the primary particles, or a mixture of single primary particles and secondary particles. A shape of the particles is not particularly limited, but for example, may be spherical, elliptical, flat, fibrous, and the like.

The secondary particles of the negative electrode active material can be obtained by, for example, the following method. First, an active material raw material is reaction-synthesized to prepare an active material precursor having an average particle size of 1 μm or less. Thereafter, the active material precursor is subjected to a baking treatment, and then subjected to a pulverization treatment (grinding treatment) using a pulverizer (grinder) such as a ball mill or a jet mill. Next, in the baking treatment, the active material precursor is aggregated to be grown into secondary particles having a large particle size.

The average particle size (diameter) of the secondary particles of the negative electrode active material is preferably 3 μm or more, and more preferably 5 μm or more and 20 μm or less. Within the range, the surface area of the active material is small, and thus, decomposition of water can be further suppressed.

It is desirable that the average particle size of the primary particles of the negative electrode active material is 1 μm or less. Then, a diffusion distance of an Li ion inside the active material is shortened, and the specific surface area is increased. Therefore, excellent high input performance (rapid charging) can be obtained. On the other hand, when the average particle size of the primary particles of the negative electrode active material is small, aggregation of particles is likely to occur. When the particles of the negative electrode active material aggregate, the aqueous electrolyte is easily unevenly distributed in the negative electrode in the secondary battery, and there is a risk of depletion of ion species in the positive electrode. Therefore, it is preferred that the average particle size of the primary particles of the negative electrode active material is 0.001 μm or more. It is more preferred that the average particle size of the primary particles of the negative electrode active material is 0.1 μm or more and 0.8 μm or less.

In addition, the primary particle size and the secondary particle size mean particle sizes at which a volume integrated value is 50%, in a particle size distribution determined by a laser diffraction type particle size distribution measuring device. As a laser diffraction type particle size distribution measuring device, for example, Shimadzu SALD-300 is used. In the measurement, a luminous intensity distribution is measured 64 times with at intervals of 2 seconds. As a sample for measuring the particle size distribution, a dispersion solution diluted with N-methyl-2-pyrrolidone so that a concentration of the negative electrode active material particles is 0.1 mass % to 1 mass %, is used. Alternatively, as a measurement sample, a sample dispersed in 1 to 2 ml of distilled water containing 0.1 g of the negative electrode active material and a surfactant is used.

The specific surface area of the negative electrode active material in a BET method by nitrogen ($N_2$) adsorption is for example, within a range of 3 $m^2$/g or more and 200 $m^2$/g or less. When the specific surface area of the negative electrode active material is within the range, affinity between the negative electrode and the aqueous electrolyte can be further increased. The specific surface area can be determined, for example, in the same manner as in the specific surface area of the negative electrode active material-containing layer.

The negative electrode active material-containing layer may further include a conductive agent, a binder, and the like, in addition to the negative electrode active material.

The conductive agent is blended as necessary for improving current collecting performance and suppressing a contact resistance between the active material and the current collector. Examples of the conductive agent include carbonaceous materials such as acetylene black, Ketjen black, graphite, and coke. The conductive agent may be used alone or in combination of two or more.

The binder has an action of binding the active material, the conductive agent, and the current collector. As the binder, for example, at least one selected from the group consisting of polytetrafluoroethylene (PTFE), polyvinylidene fluoride (PVdF), cellulose-based polymers such as carboxymethyl cellulose (CMC), fluorine-based rubber, styrene butadiene rubber, acrylic resins or copolymers thereof, polyacrylic acid, and polyacrylonitrile can be used, but is not limited thereto. The binder may be used alone or in combination of two or more.

It is preferred that respective blending ratios of the negative electrode active material, the conductive agent, and the binder in the negative electrode active material-containing layer are in ranges of 70 mass % or more and 95 mass % or less, 3 mass % or more and 20 mass % or less, and 2 mass % or more and 10 mass % or less. When the blending ratio of the conductive agent is 3 mass % or more, conductivity of the negative electrode can be improved, and when the blending ratio is 20 mass % or less, decomposition of the aqueous electrolyte on the surface of the conductive agent can be decreased. When the blending ratio of the binder is 2 mass % or more, sufficient electrode strength is obtained, and when the blending ratio is 10 mass % or less, an insulation portion of the electrode can be decreased.

The negative electrode can be obtained by, for example, the following method. First, the active material, the conductive agent, and the binder are suspended in an appropriate solvent to prepare a slurry. Next, the slurry is applied to one or both surfaces of the current collector. A coating film on the current collector is dried to form the active material-containing layer. Thereafter, the current collector and the active material-containing layer formed thereon are pressed. As the active material-containing layer, a layer obtained by forming a mixture of the active material, the conductive agent, and the binder in a pellet shape may be used.

(Positive Electrode)

The positive electrode may include a positive electrode current collector and a positive electrode active material-containing layer supported on at least one main surface of the positive electrode current collector.

The positive electrode current collector is formed of, for example, a metal such as stainless steel, aluminum (Al), and titanium (Ti). The positive electrode current collector is, for example, in the form of a foil, a porous body, or a mesh. In order to prevent corrosion by a reaction between the positive electrode current collector and the aqueous electrolyte, a surface of the positive electrode current collector may be coated with a foreign element. It is preferred that the positive electrode current collector is a material having excellent corrosion resistance and acid resistance, such as a Ti foil. When $Li_2SO_4$ is used as the aqueous electrolyte, corrosion does not proceed, and thus, Al may be used as the positive electrode current collector.

The positive electrode active material-containing layer contains the positive electrode active material. The positive electrode active material-containing layer may be supported on both main surfaces of the positive electrode current collector.

As the positive electrode active material, a compound having a lithium ion adsorption/desorption potential of 2.5 V (vs. Li/Li$^+$) or more and 5.5 V (vs. Li/Li$^+$) or less, as a potential based on metal lithium, can be used. The positive electrode may contain one kind of positive electrode active material, or two or more kinds of positive electrode active materials.

Examples of the positive electrode active material include lithium manganese composite oxides, lithium nickel composite oxides, lithium cobalt aluminum composite oxides, lithium nickel cobalt manganese composite oxides, spinel-type lithium manganese nickel composite oxides, lithium manganese cobalt composite oxides, lithium iron oxides, lithium fluorinated iron sulfates, phosphate compounds having an olivine crystal structure (for example, $Li_xFePO_4$ ($0<x\le1$), $Li_xMnPO_4$ ($0<x\le1$)), and the like. The phosphate compound having an olivine crystal structure has excellent thermal stability.

Examples of the positive electrode active material having a high positive electrode potential include lithium manganese composite oxides such as $Li_xMn_2O_4$ ($0<x\le1$) having a spinel structure and $Li_xMnO_2$ ($0<x\le1$), lithium nickel aluminum composite oxides such as $Li_xNi_{1-y}Al_yO_2$ ($0<x\le1$, $0<y<1$), lithium cobalt composite oxides such as $Li_xCoO_2$ ($0<x\le1$), lithium nickel cobalt composite oxides such as $Li_xNi_{1-y-z}Co_yMn_zO_2$ ($0<x\le1$, $0<y<1$, $0\le z<1$), lithium manganese cobalt composite oxides such as $Li_xMn_yCo_{1-y}O_2$ ($0<x\le1$, $0<y<1$), spinel-type lithium manganese nickel composite oxides such as $Li_xMn_{1-y}Ni_yO_4$ ($0<x\le1$, $0<y<2$, $0<1-y<1$), lithium phosphates having an olivine structure such as $Li_xFePO_4$ ($0<x\le1$), $Li_xFe_{1-y}Mn_yPO_4$ ($0<x\le1$, $0\le y\le1$), and $Li_xCoPO_4$ (0<x≤1), and fluorinated iron sulfate (for example, $Li_xFeSO_4F$ (0<x≤1)).

It is preferred that the positive electrode active material is at least one selected from the group consisting of lithium cobalt composite oxides, lithium manganese composite oxides, and lithium phosphates having an olivine structure. An operating potential of the active material is 3.5 V (vs·Li/Li$^+$) or more and 4.2 V (vs·Li/Li$^+$) or less. That is, the operating potential of the active material is relatively high. When the positive electrode active material is used in combination with the negative electrode active material such as spinel-type lithium titanate and anatase-type titanium oxide described above, a high battery voltage can be obtained.

The positive electrode active material is contained in the positive electrode, for example, in the form of particles. The positive electrode active material particles may be primary particles alone, secondary particles which are an aggregate of the primary particles, or a mixture of primary particles and secondary particles. A shape of the particles is not particularly limited, but for example, may be spherical, elliptical, flat, fibrous, or the like.

The average particle size (diameter) of the primary particles of the positive electrode active material is preferably 10 µm or less, and more preferably 0.1 µm or more and 5 µm or less. The average particle size (diameter) of the secondary particles of the positive electrode active material is preferably 100 µm or less, and more preferably 10 µm or more and 50 µm or less.

A primary particle size and a secondary particle size of the positive electrode active material can be measured in the same manner as in the negative electrode active material.

The positive electrode active material-containing layer may further include a conductive agent, a binder, and the like, in addition to the positive electrode active material. The conductive agent is blended as necessary for improving current collecting performance and suppressing a contact resistance between the active material and the current collector. Examples of the conductive agent include carbonaceous materials such as acetylene black, Ketjen black, graphite, and coke. The conductive agent may be used alone or in combination of two or more.

Examples of the binder include polytetrafluoroethylene (PTFE), polyvinylidene fluoride (PVdF), fluorine-based rubber, ethylene-butadiene rubber, polypropylene (PP), polyethylene (PE), carboxymethyl cellulose (CMC), polyimide (PI), polyacrylimide (PAI), and the like. The binder may be used alone or in combination of two or more.

It is preferred that respective blending ratios of the positive electrode active material, the conductive agent, and the binder in the positive electrode active material-containing layer are 70 mass % or more and 95 mass % or less, 3 mass % or more and 20 mass % or less, and 2 mass % or more and 10 mass % or less. When the blending ratio of the conductive agent is 3 mass % or more, conductivity of the positive electrode can be improved, and when the blending ratio is 20 mass % or less, decomposition of the aqueous electrolyte on the surface of the conductive agent can be decreased. When the blending ratio of the binder is 2 mass % or more, sufficient electrode strength is obtained, and when the blending ratio is 10 mass % or less, an insulation portion of the electrode can be decreased.

The positive electrode can be obtained by, for example, the following method. First, the active material, the conductive agent, and the binder are suspended in an appropriate solvent to prepare a slurry. Next, the slurry is applied to one or both surfaces of the current collector. A coating film on the current collector is dried to form the active material-containing layer. Thereafter, the current collector and the active material-containing layer formed thereon are pressed. As the active material-containing layer, a layer obtained by forming a mixture of the active material, the conductive agent, and the binder in a pellet shape may be used.

An electrode group according to the second embodiment includes the negative electrode, the positive electrode, and the separator according to the first embodiment. By providing the separator according to the first embodiment, the secondary battery including the electrode group according to the second embodiment can realize a high energy density and a long life characteristic.

Third Embodiment

A secondary battery according to a third embodiment includes a positive electrode, a negative electrode, an aqueous electrolyte, and the separator according to the first embodiment between the positive electrode and the negative electrode. In addition, a secondary battery according to a third embodiment includes an electrode group according to the second embodiment.

Figure 3:
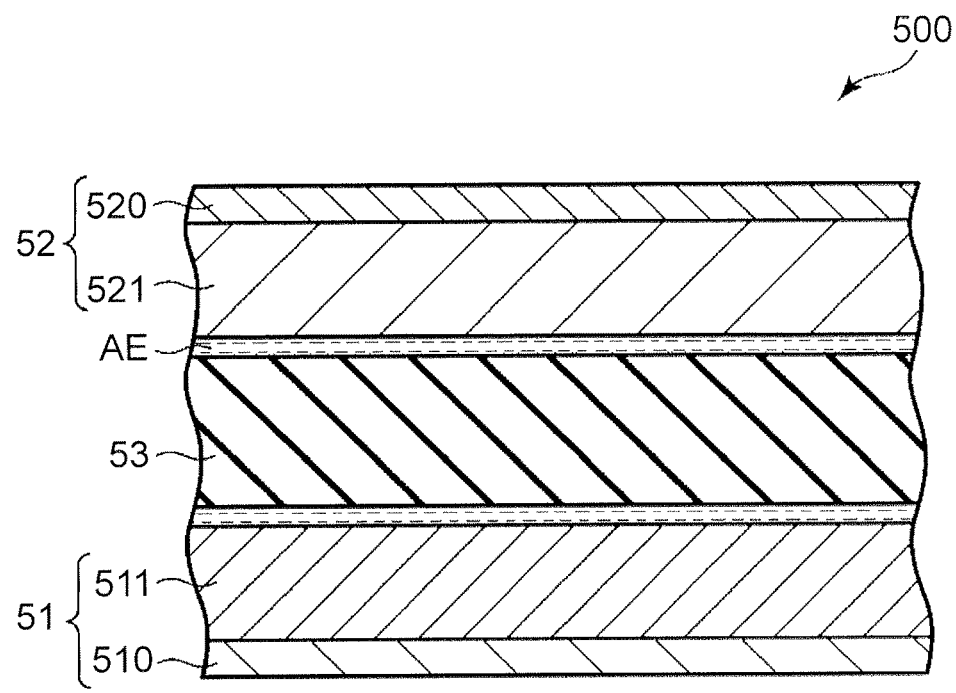
FIG. 3 is a cross-sectional view schematically illustrating an example of a secondary battery according to a third embodiment.

FIG. 3 is a cross-sectional view schematically illustrating an example of the secondary battery according to the third embodiment. A secondary battery 500 illustrated in FIG. 3 includes a negative electrode 51, a positive electrode 52, a separator 53, and an aqueous electrolyte AE. The secondary battery 500 illustrated in FIG. 3 is a lithium ion secondary battery. Here, the lithium ion secondary battery will be described as an example, but the kind of alkali metal ions which can be adsorbed and released by the negative electrode and the positive electrode is not particularly limited. Examples of the alkali metal ion other than the lithium ion include a sodium ion and a potassium ion.

The negative electrode 51 may include a negative electrode current collector 510 and a negative electrode active material-containing layer 511 supported on one main surface of the negative electrode current collector 510. The positive electrode 52 may include a positive electrode current collector 520 and a positive electrode active material-containing layer 521 supported on one main surface of the positive electrode current collector 520.

The separator 53 is positioned between the negative electrode active material-containing layer 511 and the positive electrode active material-containing layer 521. The separator 53 partitions a negative electrode 51 side at which the negative electrode 51 is positioned and a positive electrode 52 side at which the positive electrode 52 is positioned, inside the secondary battery 500.

The aqueous electrolyte AE is present in a space positioned between the negative electrode current collector 510 and the positive electrode current collector 520. Examples of the space include holes in the negative electrode active material-containing layer 511 and the positive electrode active material-containing layer 521, an interface between the negative electrode active material-containing layer 511 and the separator 53 and an interface between the positive electrode active material-containing layer 521 and the separator 53, and a gap in the separator 53. The aqueous electrolyte AE is an aqueous solution containing an aqueous solvent and an electrolyte salt dissolved in the aqueous solvent.

FIG. 3 is represented so that the aqueous electrolyte AE is present between the separator 53 and the negative electrode 51 or the positive electrode 52, but the separator and at least one of the negative electrode and the positive electrode may be in contact with each other.

Since the separator included in the secondary battery according to the third embodiment has been described in the first embodiment, a description thereof will be omitted. As the negative electrode and the positive electrode, the negative electrode and the positive electrode described in the electrode group according to the second embodiment can be used, and thus, a description thereof will be omitted. Hereinafter, an aqueous electrolyte and a container will be described.

(Aqueous Electrolyte)

An aqueous electrolyte includes an aqueous solvent and an electrolyte salt. The aqueous electrolyte is, for example, a liquid. A liquid aqueous electrolyte is prepared by dissolving an electrolyte salt as a solute in an aqueous solvent.

As the electrolyte salt, for example, a lithium salt, a sodium salt, or a mixture thereof can be preferably used. As the lithium salt and the sodium salt, the same salts which can be included in the separator can be used. It is preferred that the lithium salt includes LiCl. When LiCl is used, a lithium ion concentration of the aqueous electrolyte can be increased. Further, it is preferred that the lithium salt includes at least one of $LiSO_4$ and LiOH, in addition to LiCl.

A molar concentration of the lithium ion in the aqueous electrolyte is preferably 3 mol/L or more, more preferably 6 mol/L or more, and still more preferably 12 mol/L or more. When the concentration of the lithium ion in the aqueous electrolyte is high, electrolysis of the aqueous solvent in the negative electrode is easily suppressed, and generation of hydrogen from the negative electrode tends to be small.

It is preferred that the aqueous electrolyte has an amount of the aqueous solvent of 1 mol or more with respect to 1 mol of the salt as the solute. In a more preferred embodiment, the amount of aqueous solvent is 3.5 mol or more with respect to 1 mol of the salt as the solute.

It is preferred that the aqueous electrolyte includes at least one selected from the group consisting of a chloride ion (Cl−), a hydroxide ion (OH−), a sulfate ion ($SO_4^{2-}$), and a nitrate ion ($NO_3^-$) as anionic species.

A pH of the aqueous electrolyte is preferably 3 or more and 14 or less, and more preferably 4 or more and 13 or less.

Further, it is preferred that the pH of the aqueous electrolyte is different between a negative electrode side and a positive electrode side after an initial charge. In the secondary battery after the initial charge, the pH of the aqueous electrolyte in the negative electrode side is preferably 3 or more, more preferably 5 or more, and still more preferably 7 or more. Further, in the secondary battery after the initial charge, the pH of the aqueous electrolyte in the positive electrode side is preferably in a range of 0 or more and 7 or less, and more preferably in a range of 0 or more and 6 or less.

The pH of the aqueous electrolyte in the negative electrode side and the positive electrode side can be obtained, for example, by disassembling the secondary battery and measuring the pH of the aqueous electrolyte present between the separator and the negative electrode and between the separator and the positive electrode, respectively.

As the aqueous solvent, a solution containing water can be used. Here, the solution containing water may be pure water, or may be a mixed solvent of water and an organic solvent.

The aqueous electrolyte may be a gel electrolyte. The gel electrolyte is prepared by mixing the above-described liquid aqueous electrolyte and a polymer compound to form a composite. Examples of the polymer compound include polyvinylidene fluoride (PVdF), polyacrylonitrile (PAN), polyethylene oxide (PEO), and the like.

Whether water is contained in the aqueous electrolyte can be confirmed by gas chromatography-mass spectrometry (GC-MS) measurement. Further, a salt concentration and a water content in the aqueous electrolyte can be measured by, for example, inductively coupled plasma (ICP) emission spectrometry, and the like. A molar concentration (mol/L) can be calculated by weighing a predetermined amount of the aqueous electrolyte and calculating the salt concentration contained therein. The numbers of moles of the solute and the solvent can be calculated by measuring a specific gravity of the aqueous electrolyte.

(Container)

As a container for storing the positive electrode, the negative electrode, and the aqueous electrolyte, a metal container, a laminated film container, or a resin container can be used.

As the metal container, a container having a square or cylindrical shape made of a metal can formed of nickel, iron, stainless steel, or the like can be used. As the resin container, a container made of polyethylene, polypropylene, or the like can be used.

A thickness of each of the resin container and the metal container is preferably in a range of 0.05 mm or more and 1 mm or less. A plate thickness is more preferably 0.5 mm or less, and still more preferably 0.3 mm or less.

Examples of the laminate film include a multilayer film in which a metal layer is coated with a resin layer, and the like. Examples of the metal layer include a stainless steel foil, an aluminum foil, and an aluminum alloy foil. For the resin layer, polymers such as polypropylene (PP), polyethylene (PE), nylon, polyethylene terephthalate (PET), and the like can be used. A thickness of the laminate film is preferably in a range of 0.01 mm or more and 0.5 mm or less. The thickness of the laminate film is more preferably 0.2 mm or less.

(Detailed Description of Secondary Battery)

The secondary battery according to the present embodiment can be used in various forms such as a square shape, a cylinder shape, a flat shape, a thin shape, and a coin shape. Further, a secondary battery having a bipolar structure may be used. The secondary battery having a bipolar structure has an advantage in that a plurality of cells in series can be manufactured with one cell.

Hereinafter, details of the secondary battery according to the third embodiment will be described referring to FIGS. 4 to 8.

Figure 4:
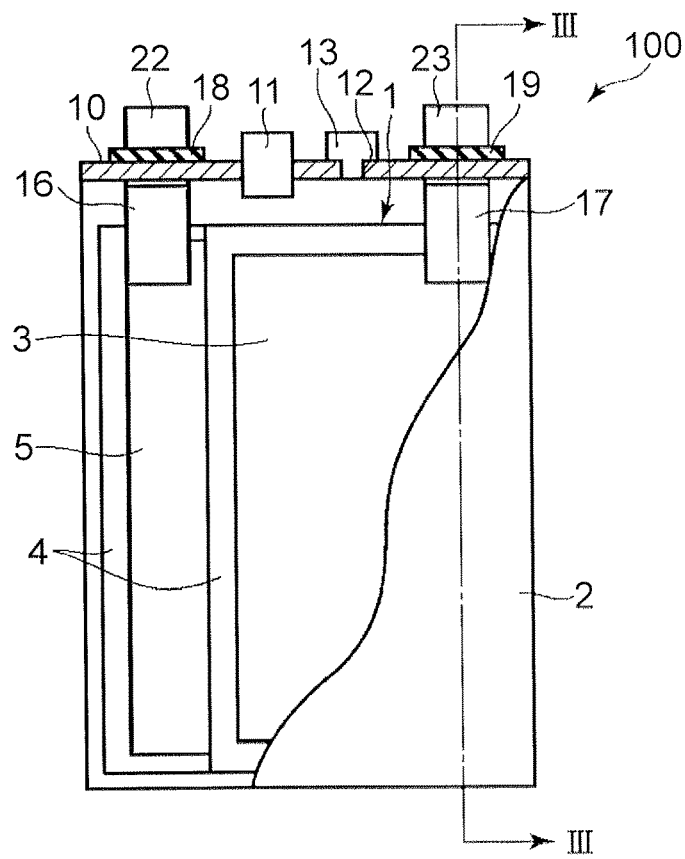
FIG. 4 is a cross-sectional view schematically illustrating another example of the secondary battery according to the third embodiment.
Figure 5:
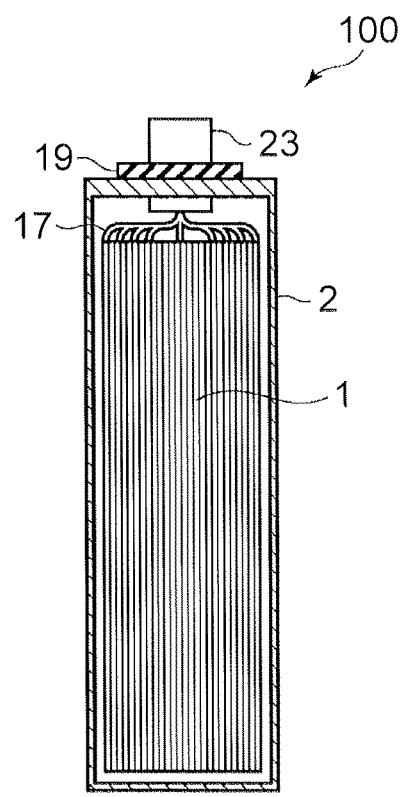
FIG. 5 is a cross-sectional view of the secondary battery illustrated in FIG. 4, taken along a line III-III.

FIG. 4 is a cross-sectional view schematically illustrating another example of the secondary battery according to the third embodiment. FIG. 5 is a cross-sectional view of the secondary battery illustrated in FIG. 3, taken along a line III-III.

An electrode group 1 is housed in a metal container 2 having a rectangular tube shape. The electrode group 1 has a structure in which a separator 4 is interposed between the positive electrode 5 and the negative electrode 3, which is spirally wound into a flat shape. The aqueous electrolyte (not shown) is held in the electrode group 1. As illustrated in FIG. 4, a belt-shaped positive electrode side lead 22 is electrically connected to each of a plurality of positions of an end of the positive electrode 5 positioned at an end surface of the electrode group 1. Further, a belt-shaped negative electrode side lead 23 is electrically connected to each of a plurality of positions of an end of the negative electrode 3 positioned at the end surface of the electrode group. The plurality of positive electrode side leads 22 are electrically connected to a positive electrode tab 16 in the state of being bundled into one. A positive electrode terminal is constituted from the positive electrode side lead 22 and the positive electrode tab 16. Further, the negative electrode side leads 23 are connected to a negative electrode tab 17 in the state of being bundled into one. A negative electrode terminal is constituted from the negative electrode side lead 23 and the negative electrode tab 17. A metal sealing plate 10 is fixed to an opening of the metal container 2 by welding or the like. The positive electrode tab 16 and the negative electrode tab 17 are drawn out from a takeout hole provided in the sealing plate 10 to the outside, respectively. An inner circumference surface of each takeout hole of the sealing plate 10 is coated with an insulation member, for avoiding a short circuit due to a contact with the positive electrode tab 16 and the negative electrode tab 17.

As illustrated in FIG. 5, the other end of the negative electrode tab 17 has a strip shape and is electrically connected to each of a plurality of positions of an end of the negative electrode 3 positioned at an upper end surface of the electrode group 1. Further, though not shown, similarly the other end of the positive electrode tab 16 has a strip shape and is electrically connected to each of a plurality of positions of an end of the positive electrode 5 positioned at an upper end surface of the electrode group 1.

In FIG. 4, the metal sealing plate 10 is fixed to an opening of the metal container 2 by welding or the like. The positive electrode side lead 22 and the negative electrode side lead 23 are drawn out from a takeout hole provided in the sealing plate 10 to the outside, respectively. In the inner circumference surface of each takeout hole of the sealing plate 10, a positive electrode gasket 18 and a negative electrode gasket 19 are disposed, respectively, for avoiding a short circuit due to a contact with the positive electrode side lead 22 and the negative electrode side lead 23. When the positive electrode gasket 18 and the negative electrode gasket 19 are disposed, airtightness of a square-shaped secondary battery 100 can be maintained.

On the sealing plate 10, a control valve 11 (safety valve) is disposed. When an internal pressure in a battery cell is increased due to gas generated by electrolysis of the aqueous solvent, the generated gas can be diffused from a control valve 11 to the outside. As the control valve 11, for example, a return-type control valve which operates when the internal pressure is higher than a set value and functions as a sealing plug when the internal pressure is decreased, can be used. Alternatively, a non-return-type control valve which does not recover the function as the sealing plug once operated, may be used. In FIG. 4, the control valve 11 is disposed in the center of the sealing plate 10, but the position of the control valve 11 may be at an end of the sealing plate 10. The control valve 11 may be omitted.

Further, the sealing plate 10 is provided with a liquid injection port 12. The aqueous electrolyte can be injected through the liquid injection port 12. The liquid injection port 12 can be closed by a sealing plug 13, after the aqueous electrolyte is injected. The liquid injection port 12 and the sealing plug 13 may be omitted.

Figure 6:
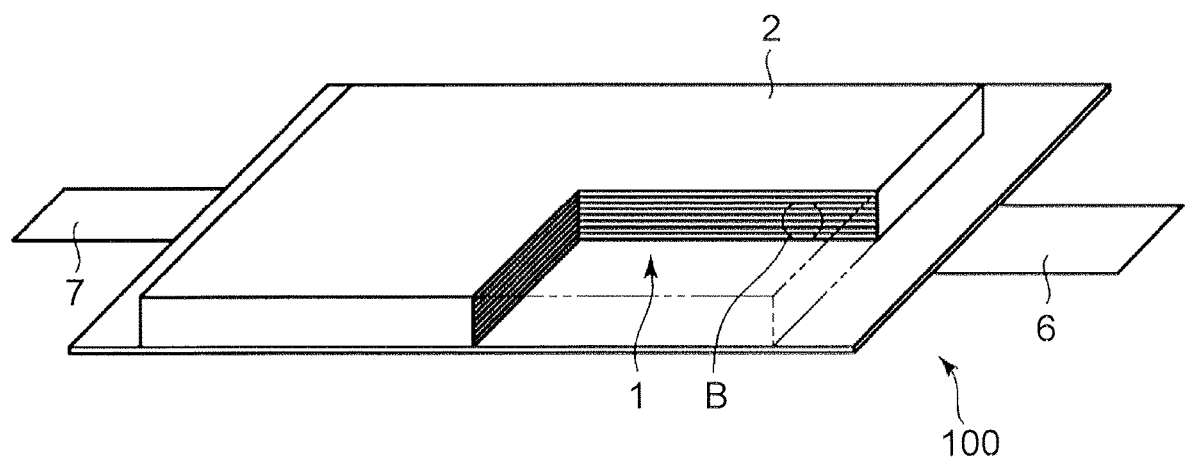
FIG. 6 is a partially cut-away perspective view schematically illustrating still another example of the secondary battery according to the third embodiment.
Figure 7:
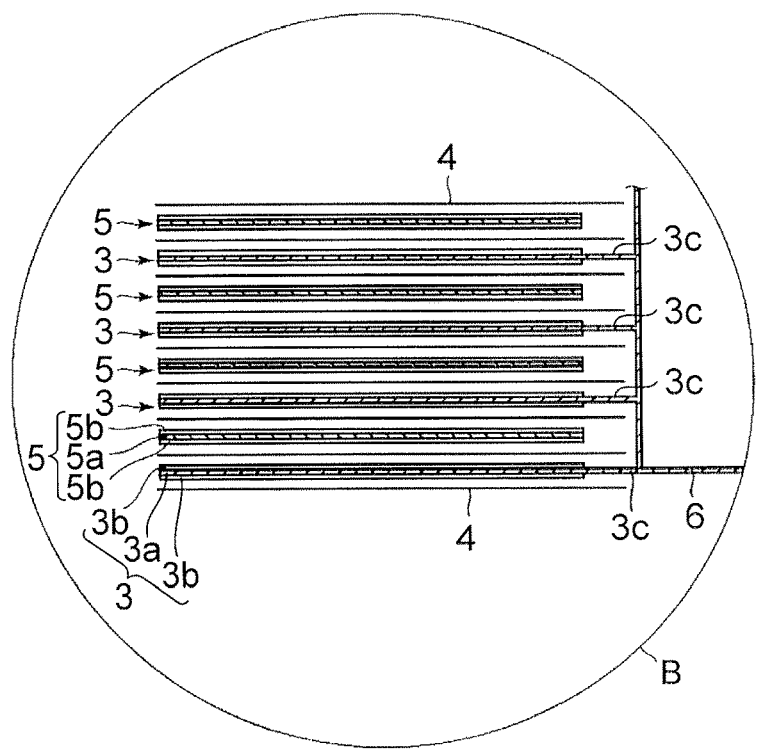
FIG. 7 is an enlarged cross-sectional view of a portion B of the secondary battery illustrated in FIG. 6.

FIG. 6 is a partially cut-away perspective view schematically illustrating still another example of the secondary battery according to the third embodiment. FIG. 7 is an enlarged cross-sectional view of a portion B of the secondary battery illustrated in FIG. 6. FIGS. 6 and 7 illustrate an example of the secondary battery 100 using a laminate film exterior member as a container.

The secondary battery 100 illustrated in FIGS. 6 and 7 includes an electrode group 1 illustrated in FIGS. 6 and 7, an exterior member 2 illustrated in FIG. 6, and an electrolyte (not shown) The electrode group 1 and the electrolyte are housed in the exterior member 2. The electrolyte is held in the electrode group 1.

The exterior member 2 is formed of a laminate film including two resin layers and a metal layer interposed therebetween.

The electrode group 1 is a laminate-type electrode group, as illustrated in FIG. 7. The laminate-type electrode group 1 has a structure in which a negative electrode 3 and a positive electrode 5 are alternately laminated with a separator 4 interposed therebetween.

The electrode group 1 includes a plurality of negative electrodes 3. Each of the plurality of negative electrodes 3 includes a negative electrode current collector 3a and a negative electrode active material-containing layer 3b supported on both surfaces of the negative electrode current collector 3a. Further, the electrode group 1 includes a plurality of positive electrodes 5. Each of the plurality of positive electrodes 5 includes a positive electrode current collector 5a and a positive electrode active material-containing layer 5b supported on both surfaces of the positive electrode current collector 5a.

The negative electrode current collector 3a of each negative electrode 3 includes a portion 3c on any surface of which the negative electrode active material-containing layer 3b is not supported, on one side. The portion 3c operates as a negative electrode current collection tab. As illustrated in FIG. 7, the portion 3c operating as the negative electrode current collection tab does not overlap the positive electrode 5. Further, a plurality of negative electrode current collection tabs (portion 3c) are electrically connected to a band-shaped negative electrode terminal 6. A tip of the band-shaped negative electrode terminal 6 is drawn out to an outside of the exterior member 2.

Further, though not shown, the positive electrode current collector 5a of each positive electrode 5 includes a portion on any surface of which the positive electrode active material-containing layer 5b is not supported, on one side. The portion operates as a positive electrode current collection tab. The positive electrode current collection tab does not overlap the negative electrode 3, similarly to the negative electrode current collection tab (portion 3c). Further, the positive electrode current collection tab is positioned on the opposite side of the electrode group 1 with respect to the negative electrode current collection tab (portion 3c). The positive electrode current collection tab is electrically connected to a band-shaped positive electrode terminal 7. A tip of the band-shaped positive electrode terminal 7 is positioned on the opposite side of the negative electrode terminal 6 and drawn out to an outside of the exterior member 2.

The secondary battery according to the third embodiment may include the separator described above. The aqueous solvent hardly passes through the separator, and the separator can be formed into a thin film. Therefore, the secondary battery according to the third embodiment can realize a high energy density and a long life characteristic.

Fourth Embodiment

According to a fourth embodiment, an assembled battery is provided. The assembled battery according to the fourth embodiment includes a plurality of secondary batteries according to the first to third embodiments.

In the assembled battery according to the fourth embodiment, each unit cell may be disposed to be electrically connected in series or in parallel, or may be disposed in a combination of series connections and parallel connections.

Next, as an example of the assembled battery according to the fourth embodiment will be described referring to the drawings.

Figure 8:
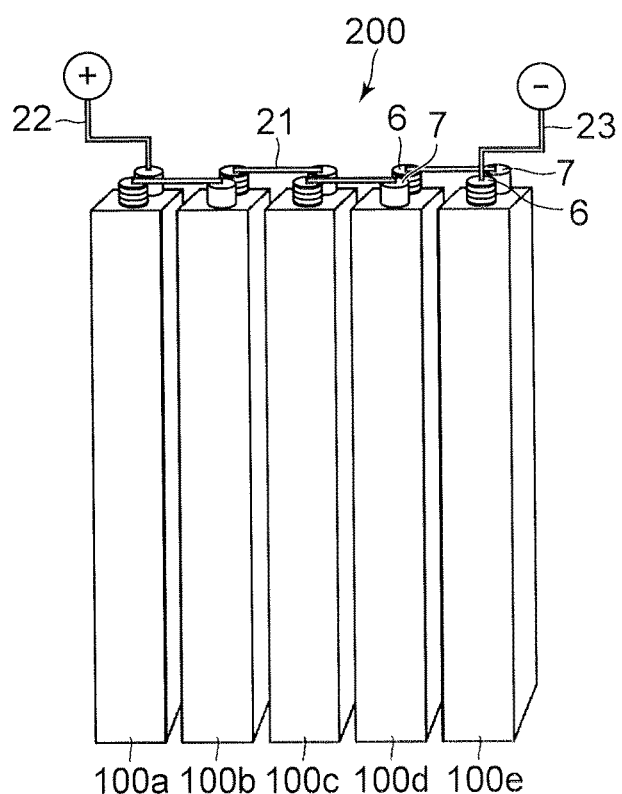
FIG. 8 is a perspective view schematically illustrating an example of an assembled battery according to a fourth embodiment.

FIG. 8 is a perspective view schematically illustrating an example of the assembled battery according to the fourth embodiment. The assembled battery 200 illustrated in FIG. 8 includes five unit cells 100a to 100e, four busbars 21, a positive electrode side lead 22, and a negative electrode side lead 23. Each of the five unit cells 100a to 100e is the secondary battery according to the third embodiment.

The busbar 21 connects a negative electrode terminal 6 of one unit cell 100a and a positive electrode terminal 7 of an adjacent unit cell 100b, for example. Thus, five unit cells 100 are connected in series by the four busbars 21. That is, the assembled battery 200 in FIG. 7 is an assembled battery of five series.

As illustrated in FIG. 8, among the five unit cells 100a to 100e, the positive electrode terminal 7 of the unit cell 100a positioned at a left end is connected to the positive electrode side lead 22 for external connection. Further, among the five unit cells 100a to 100e, the negative electrode terminal 6 of the unit cell 100e positioned at a right end is connected to the negative electrode side lead 23 for external connection.

The assembled battery according to the fourth embodiment includes the secondary battery according to the first to third embodiments. Therefore, the assembled battery according to the fourth embodiment can realize a high energy density and a long life characteristic.

Fifth Embodiment

According to a fifth embodiment, a battery pack is provided. The battery pack includes the assembled battery according to the fourth embodiment. The battery pack may include the single secondary battery according to the third embodiment, instead of the assembled battery according to the fourth embodiment.

The battery pack according to the fifth embodiment can further include a protection circuit. The protection circuit has a function of controlling charge/discharge of the secondary battery. Alternatively, a circuit included in a device using the battery pack as a power supply (for example, electronic devices, cars, and the like) may be used as the protection circuit of the battery pack.

Further, the battery pack according to the fifth embodiment can further include an external terminal for energization. The external terminal for energization is for outputting a current from the secondary battery to the outside and/or inputting a current from the outside to the secondary battery. In other words, when the battery pack is used as a power supply, the current is supplied to the outside through the external terminal for energization. When the battery pack is charged, a charging current (including regenerative energy of power of cars and the like) is supplied to the battery pack through the external terminal for energization.

Next, as an example of the battery pack according to the fifth embodiment will be described referring to the drawings.

Figure 9:
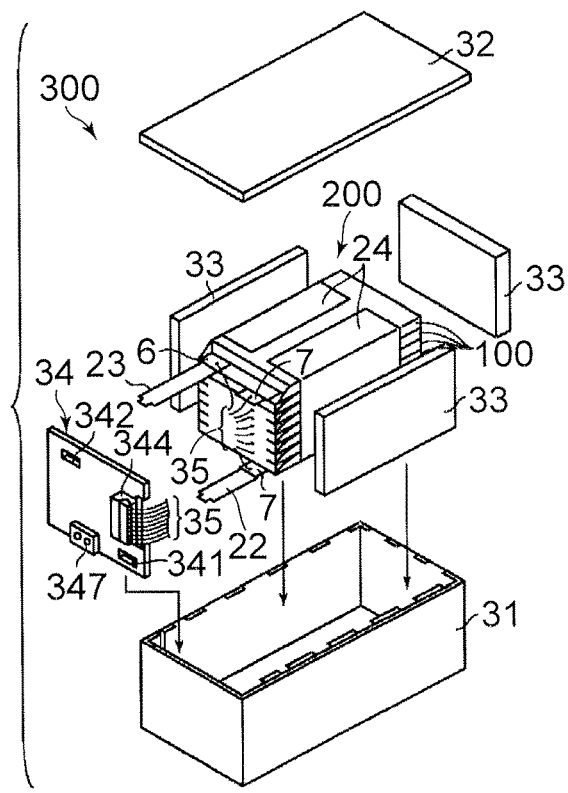
FIG. 9 is an exploded perspective view schematically illustrating an example of a battery pack according to the fifth embodiment.
Figure 10:
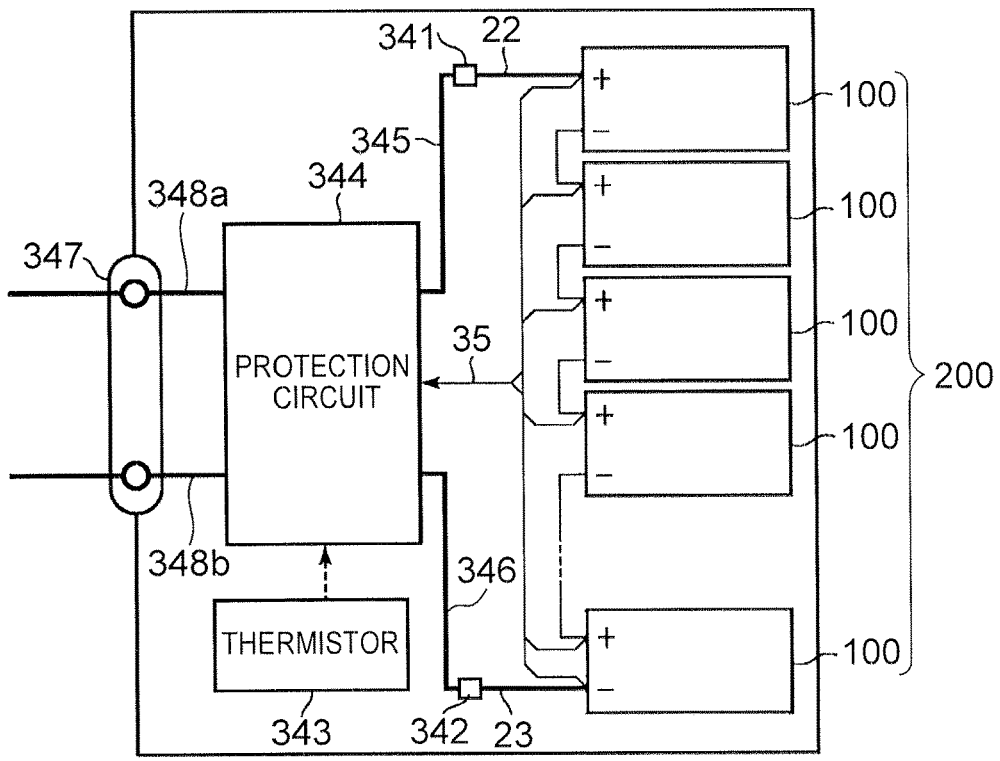
FIG. 10 is a block diagram illustrating an example of an electric circuit of the battery pack illustrated in FIG. 9.

FIG. 9 is an exploded perspective view schematically illustrating an example of a battery pack according to the fifth embodiment. FIG. 10 is a block diagram illustrating an example of an electric circuit of the battery pack illustrated in FIG. 9.

The battery pack 300 illustrated in FIGS. 9 and 10 includes a housing container 31, a lid 32, a protective sheet 33, an assembled battery 200, a printed wiring board 34, a wiring 35, and an insulation plate (not shown).

The housing container 31 illustrated in FIG. 9 is a bottomed square-shaped container having a rectangular bottom surface. The housing container 31 is configured so that the protective sheet 33, the assembled battery 200, the printed wiring board 34, and the wiring 35 can be housed therein. The lid 32 has a rectangular shape. The lid 32 houses the assembled battery 200 and the like by covering the housing container 31. The housing container 31 and the lid 32 are provided with, though not shown, an opening or a connection terminal for being connected to an external device, or the like.

The assembled battery 200 includes a plurality of unit cells 100, a positive electrode side lead 22, a negative electrode side lead 23, and an adhesive tape 24.

At least one of the plurality of unit cells 100 is the secondary battery according to the first to third embodiments. The plurality of unit cells 100 are laminated so that a negative electrode terminal 6 and a positive electrode terminal 7 extending to the outside are aligned in the same direction. Each of the plurality of unit cells 100 is electrically connected in series as illustrated in FIG. 10. The plurality of unit cells 100 may be electrically connected in parallel, or connected in a combination of series connections and parallel connections. When the plurality of unit cells 100 are connected in parallel, a battery capacity is increased as compared with the case of being connected in series.

The adhesive tape 24 engages the plurality of unit cells 100. Instead of the adhesive tape 24, a heat shrink tape may be used to fix the plurality of unit cells 100. In this case, the protective sheet 33 is disposed on both side surfaces of the assembled battery 200, the heat shrink tape is circulated, and then the heat shrink tape is thermally shrunk to bind the plurality of unit cells 100.

One end of the positive electrode side lead 22 is connected to the positive electrode terminal 7 of the unit cell 100 disposed at the lowest layer in a laminate of the unit cell 100. One end of the positive electrode side lead 22 is connected to the negative electrode terminal 6 of the unit cell 100 disposed at the uppermost layer in a laminate of the unit cell 100.

The printed wiring board 34 is provided along a surface in one short-side direction of the inner side surface of the housing container 31. The printed wiring board 34 includes a positive electrode side connector 341, a negative electrode side connector 342, a thermistor 343, a protection circuit 344, wirings 345 and 346, an external terminal for energization 347, a plus side wiring 348a, and a minus side wiring 348b. One main surface of the printed wiring board 34 faces a surface of the assembled battery 200 from which the negative electrode terminal 6 and the positive electrode terminal 7 are extended. An insulation plate (not shown) is interposed between the printed wiring board 34 and the assembled battery 200.

The positive electrode side connector 341 is provided with a through-hole. The other end of the positive electrode side lead 22 is inserted into the through-hole, thereby electrically connecting the positive electrode side connector 341 and the positive electrode side lead 22. The negative electrode side connector 342 is provided with a through-hole. The other end of the negative electrode side lead 23 is inserted into the through-hole, thereby electrically connecting the negative electrode side connector 342 and the negative electrode side lead 23.

The thermistor 343 is fixed to one main surface of the printed wiring board 34. The thermistor 343 detects each temperature of the unit cell 100 and transmits a detection signal to the protection circuit 344.

The external terminal for energization 347 is fixed to the other main surface of the printed wiring board 34. The external terminal for energization 347 is electrically connected to a device present outside the battery pack 300.

The protection circuit 344 is fixed to the other main surface of the printed wiring board 34. The protection circuit 344 is connected to the external terminal for energization 347 via the plus side wiring 348a. The protection circuit 344 is connected to the external terminal for energization 347 via the minus side wiring 348b. Further, the protection circuit 344 is electrically connected to the positive electrode side connector 341 via the wiring 345. The protection circuit 344 is electrically connected to the negative electrode side connector 342 via the wiring 346. Further, the protection circuit 344 is electrically connected to each of the plurality of unit cells 100 via the wiring 35.

The protective sheets 33 are disposed on both inner side surfaces in a long-side direction of the housing container 31 and on the inner side surface in a short-side direction facing the printed wiring board 34 via the assembled battery 200. The protective sheet 33 is formed of, for example, a resin or a rubber.

The protection circuit 344 controls charge/discharge of the plurality of unit cells 100. Further, the protection circuit 344 blocks electrical connection between the protection circuit 344 and the external terminal for energization 347, based on a detection signal transmitted from the thermistor 343, or a detection signal transmitted from each of the unit cells 100 or the assembled battery 200.

Examples of the detection signal transmitted from the thermistor 343 include a signal which has detected that a temperature of the unit cell 100 is a predetermined temperature or higher. Examples of the detection signal transmitted from each of the unit cells 100 or the assembled battery 200 include a signal which has detected overcharge, overdischarge, and overcurrent of the unit cell 100. When the overcharge and the like for each of the unit cells 100 are detected, a battery pressure may be detected, and a positive electrode potential or a negative electrode potential may be detected. In the latter case, a lithium electrode as a reference electrode is inserted into each unit cell 100.

In addition, as the protection circuit 344, a circuit included in a device using the battery pack 300 as a power supply (for example, electronic devices, cars, and the like) may be used.

Further, the battery pack 300 includes the external terminal for energization 347 as described above. Therefore, the battery pack 300 can output a current from the assembled battery 200 to an external device and input a current from the external device to the assembled battery 200, via the external terminal for energization 347. In other words, when the battery pack 300 is used as a power supply, the current from the assembled battery 200 is supplied to the external device through the external terminal for energization 347. When the battery pack 300 is charged, a charging current from the external device is supplied to the battery pack 300 through the external terminal for energization 347. When the battery pack 300 is used as an on-vehicle battery, regenerative energy of vehicle power can be used as the charging current from the external device.

The battery pack 300 may include a plurality of assembled batteries 200. In this case, the plurality of assembled batteries 200 may be connected in series, connected in parallel, or connected in a combination of series connections and parallel connections. Further, the printed wiring board 34 and the wiring 35 may be omitted. In this case, the positive electrode side lead 22 and the negative electrode side lead 23 may be used as the external terminal for energization.

Such a battery pack is used, for example, for applications requiring excellent cycle performance when a large current is taken out. The battery pack is used as, specifically, a power supply of an electronic device, a stationary battery, and an on-vehicle battery for various vehicles. Examples of the electronic device include a digital camera. The battery pack is particularly suitably used as the on-vehicle battery.

The battery pack according to the fifth embodiment includes the secondary battery according to the first to third embodiments or the assembled battery according to the fourth embodiment. Therefore, the battery pack according to the fifth embodiment can realize a high energy density and a long life characteristic.

Sixth Embodiment

According to a sixth embodiment, a vehicle is provided. The vehicle is equipped with the battery pack according to the fifth embodiment.

In the vehicle according to the sixth embodiment, the battery pack is, for example, for recovering regenerative energy of power of the vehicle. The vehicle according to the sixth embodiment includes a mechanism which converts kinetic energy of the vehicle into the regenerative energy.

Examples of the vehicle according to the sixth embodiment include two to four-wheeled hybrid electric cars, two to four-wheeled electric cars, assisted bicycles, and railroad vehicles.

A mounting position of the battery pack in the vehicle according to the sixth embodiment is not particularly limited. For example, when the battery pack is mounted on a car, the battery pack can be mounted on an engine room of the vehicle, in the rear of a vehicle body, or under a seat.

The vehicle according to the sixth embodiment may be equipped with a plurality of battery packs. In this case, the battery pack may be electrically connected in series, electrically connected in parallel, or electrically connected in a combination of series connections and parallel connections.

Next, an example of the vehicle according to the sixth embodiment will be described referring to the drawings.

Figure 11:
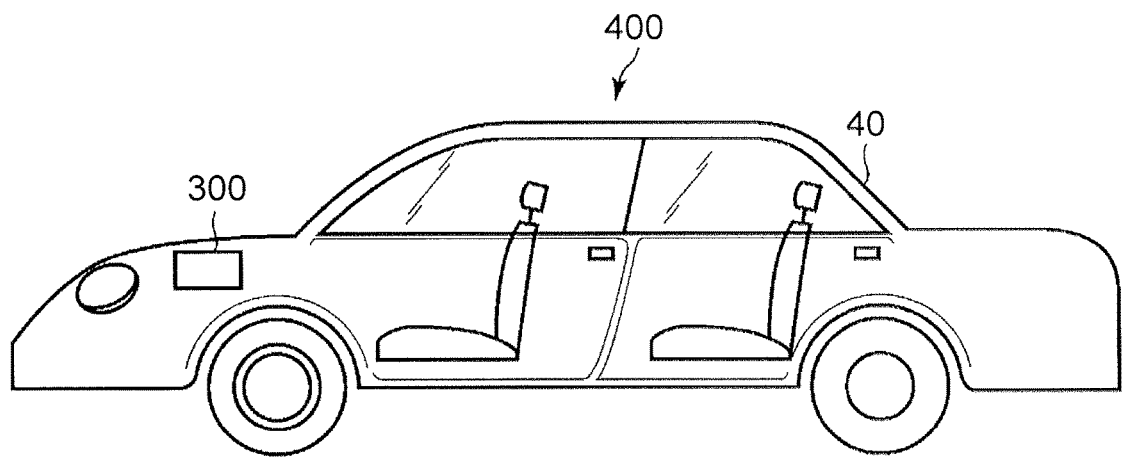
FIG. 11 is a cross-sectional view schematically illustrating an example of a vehicle according to the sixth embodiment.

FIG. 11 is a cross-sectional view schematically illustrating an example of the vehicle according to the sixth embodiment.

The vehicle 400 illustrated in FIG. 11 includes a vehicle body 40 and the battery pack 300 according to the fifth embodiment. In an example illustrated in FIG. 11, the vehicle 400 is a four-wheeled car.

The vehicle 400 may be equipped with a plurality of battery packs 300. In this case, the battery pack 300 may be connected in series, connected in parallel, or connected in a combination of series connections and parallel connections.

FIG. 11 illustrates an example in which the battery pack 300 is mounted in an engine room positioned in the front of the vehicle body 40. As described above, the battery pack 300 may be mounted, for example, in the rear of the vehicle body 40 or under seats. The battery pack 300 can be used as a power supply of the vehicle 400. Further, the battery pack 300 can recover regenerative energy of power of the vehicle 400.

The vehicle according to the sixth embodiment is equipped with the battery pack according to the fifth embodiment. Therefore, the vehicle according to the sixth embodiment can realize a high energy density and a long life characteristic.

Seventh Embodiment

According to a seventh embodiment, a stationary power supply is provided. The stationary power supply is equipped with the battery pack according to the fifth embodiment. The stationary power supply may be equipped with the assembled battery according to the fourth embodiment and the secondary battery according to the first to third embodiments, instead of the battery pack according to the fifth embodiment.

The stationary power supply according to the seventh embodiment is equipped with the battery pack according to the fifth embodiment. Therefore, the stationary power supply according to the seventh embodiment can realize a long life.

Figure 12:
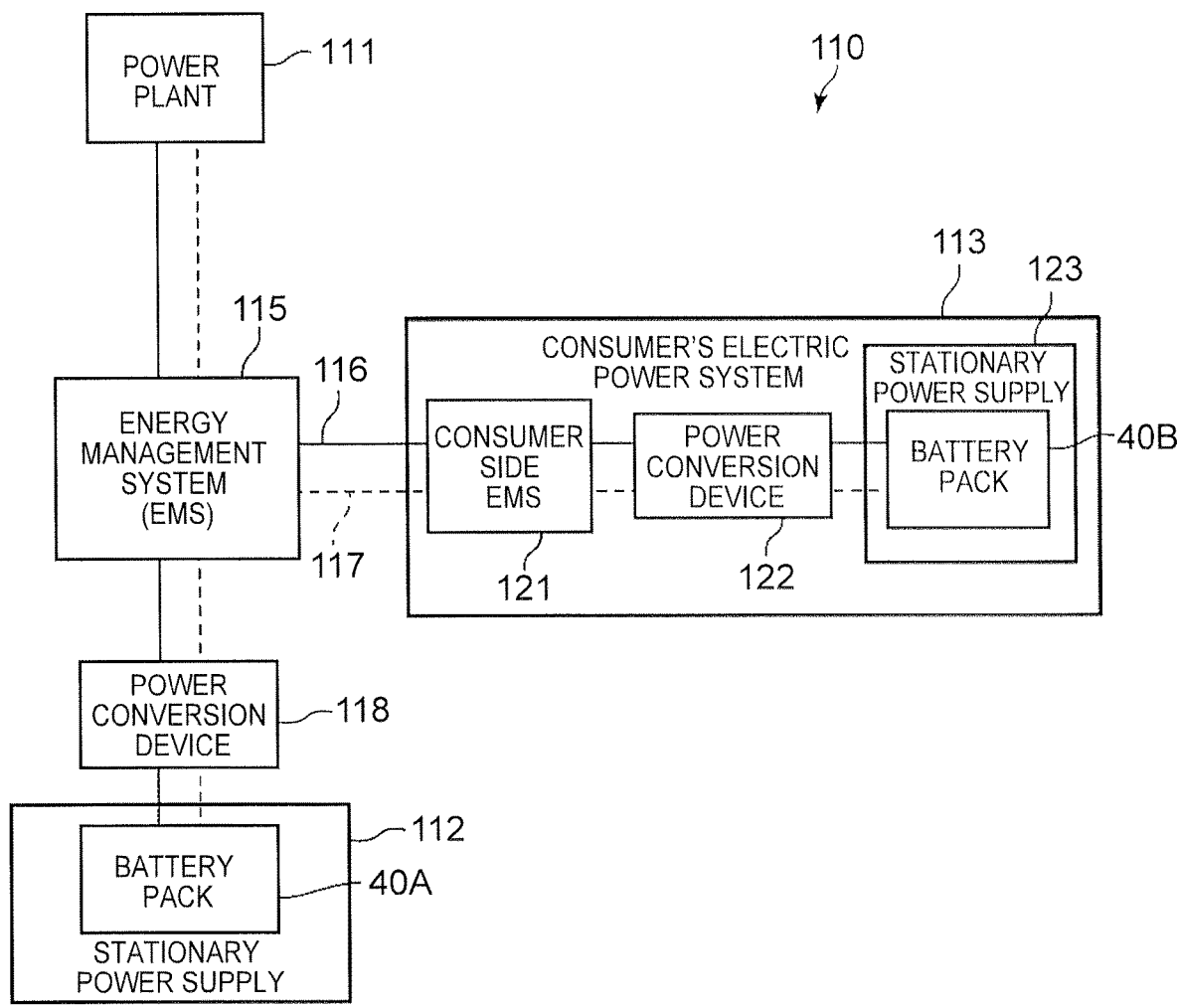
FIG. 12 is a block diagram illustrating an example of a system including a stationary power supply according to the seventh embodiment.

FIG. 12 is a block diagram illustrating an example of a system including a stationary power supply according to the seventh embodiment. FIG. 12 is a drawing illustrating an example of application to the stationary power supplies 112 and 123, as an example of using battery packs 300A and 300B according to the fifth embodiment. In an example illustrated in FIG. 12, a system 110 in which the stationary power supplies 112 and 123 are used is illustrated. The system 110 includes a power plant 111, a stationary power supply 112, a consumer's electric power system 113, and an energy management system (EMS) 115. Further, an electrical grid 116 and a communication network 117 are formed in the system 110, and the power plant 111, the stationary power supply 112, the consumer's electric power system 113, and EMS 115 are connected via the electrical grid 116 and the communication network 117. EMS 115 utilizes the electrical grid 116 and the communication network 117 to control the stabilization of the entire system 110.

The power plant 111 generates a large amount of electric power by a fuel source such as thermal power and nuclear power. Electric power is supplied through the electrical grid 116 or the like, from the power plant 111. A battery pack 300A is mounted on the stationary power supply 112. The battery pack 300A can store electric power or the like supplied from the power plant 111. Further, the stationary power supply 112 can supply the electric power stored in the battery pack 300A through the electrical grid 116 or the like. The system 110 includes a power conversion device 118. The power conversion device 118 includes a converter, an inverter, a transformer, and the like. Therefore, the power conversion device 118 can perform conversion between direct current and alternating current, conversion between alternating currents having different frequencies from each other, transformation (step-up and step-down), and the like. Therefore, the power conversion device 118 can convert the electric power from the power plant 111 into electric power capable of being stored in the battery pack 300A.

A consumer's electric power system 113 includes a factory power system, a building power system, a home power system, and the like. The consumer's electric power system 113 has a customer side EMS 121, a power conversion device 122, and a stationary power supply 123. A battery pack 300B is mounted on the stationary power supply 123. The customer side EMS 121 controls stabilization of the consumer's electric power system 113.

Electric power from the power plant 111 and electric power from the battery pack 300A are supplied to the consumer's electric power system 113 through the electrical grid 116. The battery pack 300B can store electric power supplied to the consumer's electric power system 113. Further, the power conversion device 121 includes a converter, an inverter, a transformer, and the like, like the power conversion device 118. Therefore, the power conversion device 121 can perform conversion between direct current and alternating current, conversion between alternating currents having different frequencies from each other, transformation (step-up and step-down), and the like. Therefore, the power conversion device 121 can convert the electric power supplied to the consumer's electric power system 113 into electric power capable of being stored in the battery pack 300B.

The electric power stored in the battery pack 300B can be used, for example, for charging a vehicle such as electric cars. Further, the system 110 may also be provided with a natural energy source. In this case, the natural energy source generates electric power by natural energy such as wind and sunlight. Then, the electric power is supplied through the electrical grid 116, also from the natural energy source in addition to the power plant 111.

EXAMPLES

Examples will be described in the following. Embodiments are not limited to the following examples.

Example 1

<Manufacture of Positive Electrode>

A positive electrode was manufactured as follows. First, a positive electrode active material, a conductive agent, and a binder were dispersed in a N-methyl-2-pyrrolidone (NMP) solvent to prepare a slurry. Ratios of the positive electrode active material, the conductive agent, and the binder were 91 mass %, 4.5 mass %, and 4.5 mass %, respectively. As the positive electrode active material, a lithium manganese composite oxide ($LiMn_2O_4$) having a spinel structure and an average particle size of 10 μm was used. A lithium ion adsorption/desorption potential of the lithium manganese composite oxide was 3.5 V (vs. $Li/Li^+$) or more and 4.2 V (vs. $Li/Li^+$) or less. As the conductive agent, graphite powder was used. As the binder, polyvinylidene fluoride (PVdF) was used.

Next, the prepared slurry was applied to both surfaces of the positive electrode current collector, and a coating film was dried to form a positive electrode active material-containing layer. As the positive electrode current collector, a Ti foil having a thickness of 12 μm was used. Next, the positive electrode current collector and the positive electrode active material-containing layer were pressed to manufacture a positive electrode. A density of the positive electrode active material-containing layer was 3.0 g/cm$^3$.

<Manufacture of Negative Electrode>

A negative electrode was manufactured as follows. First, a negative electrode active material, a conductive agent, and a binder were dispersed in an NMP solvent to prepare a slurry. As the negative electrode active material, a lithium titanium oxide ($Li_4Ti_5O_{12}$) powder having an average secondary particle size (diameter) of 15 μm was used. A lithium ion adsorption/desorption potential of the lithium titanium oxide was 1.5 V (vs. $Li/Li^+$) or more and 1.7 V (vs. $Li/Li^+$) or less. As the conductive agent, graphite powder was used. As the binder, polyvinyl butyral (PVB) was used. Ratios of the negative electrode active material, the conductive agent, and the binder were 94.3 mass %, 4.7 mass %, and 1.0 mass %, respectively.

Next, the obtained slurry was applied to the negative electrode current collector, and a coating film was dried to form a negative electrode active material-containing layer. As the negative electrode current collector, a Zn foil having a thickness of 50 μm was used. Here, when the slurry was applied to the Zn foil, among the manufactured negative electrodes, the slurry was applied to only one surface of the Zn foil for a portion positioned in an outermost circumference of an electrode group, and the slurry was applied to both surfaces of the Zn foil for the other portion. Next, the negative electrode current collector and the negative electrode active material-containing layer were pressed to obtain a negative electrode. A density of the negative electrode active material-containing layer was 2.0 g/cm$^3$.

<Manufacture of Separator>

A glass solid electrolyte LATP ($Li_{1.5}Al_{0.5}Ti_{1.5}(PO_4)_3$) as inorganic particles, polyvinyl butyral (PVB) as a polymeric binder, a cellulose nanofiber as a fiber substance, and N-methyl-2-pyrrolidone (NMP) as a solvent were mixed using a planetary mixer to obtain a slurry. An average particle size of the LATP particles was 1.0 μm. An average fiber diameter of the cellulose nanofiber was 15 nm. The slurry was adjusted so that mass ratios of the LATP particles, the PVB resin, and the cellulose nanofiber were LATP particles 84%, PVB resin 15%, and cellulose nanofiber 1%, when a total mass of the LATP particles, the PVB resin, and the cellulose nanofibers is 100%, that is, LATP particles: PVB resin:cellulose nanofiber were 84:15:1. A solid content concentration of the slurry was 50 mass %.

Next, the slurry was poured into a mold made of Teflon (registered trademark), and then dried in a vacuum furnace at 50° C. for 24 hours to remove the NMP solvent. A thickness of the obtained separator was 20 μm. In the separator, a ratio of the LATP particles was 84 mass %, a ratio of the PVB resin was 15 mass %, and a ratio of the cellulose nanofiber was 1 mass %. Hereinafter, the separator is referred to as a separator SP1. The separator SP1 was manufactured in plural.

<Manufacture of Electrode Group>

A positive electrode, a first sheet of separator SP1, a negative electrode, and a second sheet of separator SP1 were laminated in this order to obtain a laminate. Next, the laminate was spirally wound so that the negative electrode is disposed on the outermost circumference, to manufacture an electrode group. This was hot-pressed at 130° C., thereby manufacturing a flat electrode group. The obtained electrode group was housed in a thin metal can made of stainless steel having a thickness of 0.25 mm. As the metal can, a metal can in which a valve for releasing gas when an internal pressure is 2 atm or more was provided, was used.

<Manufacture of Aqueous Electrolyte>

Lithium chloride (LiCl) was dissolved in water to obtain a liquid aqueous electrolyte. In the aqueous electrolyte, a molar concentration of LiCl was 12 mol/L.

<Manufacture of Secondary Battery and Initial Charge/Discharge>

The liquid aqueous electrolyte was injected into the former metal can container in which an electrode group was housed, thereby manufacturing three secondary batteries. Next, each secondary battery was allowed to stand under an environment of 25° C. for 24 hours. Thereafter, the secondary battery was initially charged/discharged under an environment of 25° C. In the initial charge/discharge, first, a constant current charge was performed with a current equivalent to a 1C rate until the voltage of the secondary battery reached 2.7 V, and then, a constant current discharge was performed with a current equivalent to a 1C rate until the voltage reached 2.1 V.

<Evaluation Method>

In the following, a method of evaluating the mass ratio of the inorganic particles, the polymeric binder, and the fiber substance included in the separator, a method of measuring the average fiber diameter of the fiber substance, and a method of measuring a charge capacity and a charge/discharge efficiency in the manufactured secondary battery will be described.

(Evaluation of Mass Ratios of Inorganic Particles, Polymeric Binder, and Fiber Substance Included in Separator)

One of the manufactured secondary batteries was disassembled to collect the separator, which was then dried well under a condition such as 50° C. in the atmosphere. Next, a part of the separator was cut out to obtain a specimen. The size of the specimen was a square plate having a side length of 2 cm. The specimen was well dried in advance under a condition such as 50° C. in the atmosphere. Next, the specimen was mixed with a sufficient amount of a solvent. After dissolving the polymeric binder, a solid content and the solvent in which the fiber substance has been melted were separated, using a centrifuge. The solid content was dried well and then subjected to thermal gravimetric analysis (TG) to obtain masses of the inorganic particles and the polymeric binder included in the solid content. On the other hand, the solution was subjected to thermal gravimetric analysis (TG), thereby obtaining the mass of the solvent and the fibrous material included in the solution. From the above, the mass ratios of the inorganic particles, the fiber substance, and the polymeric binder were obtained. The mass ratios of the inorganic particles, the polymeric binder, and the fiber substance were 84%, 15%, and 1% in order.

(Measurement Method of Average Fiber Diameter of Fiber Substance)

One of the manufactured secondary batteries was disassembled, and the separator was taken out and dried well. The surface of the separator was subjected to gold sputtering, and then observed using a scanning electron microscope (SEM). A fiber diameter of the fiber substance which can be seen in an SEM photograph was measured at 10 points, and an average thereof was calculated as the average fiber diameter.

(Measurement of Charge/Discharge Efficiency and Value of Resistance for 10 Seconds)

A charge/discharge test was performed using one of the manufactured secondary batteries, and a charge/discharge efficiency and a value of resistance for 10 seconds were measured. First, each secondary battery was charged with a constant current of 5 A under an environment of 25° C. until the battery voltage reached 2.8 V. Next, the state was maintained for 30 minutes. Next, the battery was discharged with a constant current of 5 A until the battery voltage reached 2.1 V. Next, the state was maintained for 30 minutes. These series of operations were defined as one charge/discharge cycle, and which was repeated 50 times. Next, the battery was charged with a constant current of 5 A at the 51st cycle, maintained for 30 minutes, and then discharged until the battery voltage reached 2.5 V. A ratio of the discharge capacity to the charge capacity (discharge capacity/charge capacity) at the 50th cycle was calculated to obtain the charge/discharge efficiency. Next, immediately after discharge at the 51st cycle, resistance for 10 seconds was measured. In the secondary battery after the 51st cycle of discharge, discharge with a constant current of 5 A was performed for 10 seconds. An amount of voltage change during the period was divided by the flowed current of 5 A to obtain a resistance value at a battery voltage of 2.5 V, that is, a value of resistance for 10 seconds. Table 3 shows the results of the charge/discharge efficiency and the value of resistance for 10 seconds of the obtained secondary battery.

Example 2

In the manufacture of a separator, inorganic particles LATP as a raw material, a polymeric binder PVB, and a cellulose nanofiber as a fiber substance were mixed at a weight ratio of 84:15:1, and NMP was added to prepare a slurry. The obtained slurry was applied to one surface of a cellulose nonwoven fabric as a porous free-standing film having a thickness of 15 μm by doctor blade method, and dried in the air at 120° C. to form a separator. Further, the obtained separator was used to manufacture a secondary battery in the same manner as in Example 1. At this time, in the obtained separator, the cellulose nonwoven fabric was laminated so as to face a negative electrode via an inorganic particle layer. Hereinafter, the separator is referred to as a separator SP2. Evaluation was performed in the same manner as in Example 1, except that the separator SP2 was used instead of the separator SP1.

Example 3

A separator was manufactured in the same manner as in Example 1, except that the polyvinyl alcohol fiber (PVA) was used as a fiber substance, and then the obtained separator was used to manufacture a secondary battery in the same manner as in Example 1.

Hereinafter, the separator is referred to as a separator SP3. Evaluation was performed in the same manner as in Example 1, except that the separator SP3 was used instead of the separator SP1. For the separator SP3, inorganic particles LATP, a polymeric binder PVB, and a polyvinyl alcohol fiber (PVA) as a fiber substance were mixed at a mass ratio of 84:15:1, N-methyl-2-pyrrolidone (NMP) was added, and the mixture was mixed using a planetary mixer, thereby obtaining a slurry having a solid content of 50 mass %. At this time, as the LATP particles those having an average particle size of 1.0 μm were used, and as the polyvinyl alcohol fiber (PVA), that having a molecular weight of 1,000,000 or more and an average fiber diameter of 15 nm was used.

Example 4

A separator was manufactured in the same manner as in Example 1, except that a mixture of a polyvinyl alcohol fiber (PVA) and polyacrylic acid was used as a fiber substance, and then the obtained separator was used to manufacture a secondary battery in the same manner as in Example 1. Hereinafter, the separator is referred to as a separator SP4. Evaluation was performed in the same manner as in Example 1, except that the separator SP4 was used instead of the separator SP1.

For the separator SP4, inorganic particles LATP, a polymeric binder PVB, and a mixture of the polyvinyl alcohol fiber (PVA) and polyacrylic acid as a fiber substance were mixed at a mass ratio of 84:15:0.5:0.5, thereby obtaining a slurry. At this time, as the polyvinyl alcohol fiber (PVA) and polyacrylic acid, those having a molecular weight of 1,000,000 or more and an average fiber diameter of 15 nm were used.

Example 5

A separator was manufactured in the same manner as in Example 1, except that inorganic particles LATP as a raw material, a polymeric binder PVB, and a cellulose nanofiber as a fiber substance were mixed at a mass ratio of 84.2:15:0.8 to adjust a slurry, and then the obtained separator was used to manufacture a secondary battery in the same manner as in Example 1. Hereinafter, the separator is referred to as a separator SP5. The secondary battery was obtained in the same manner as in Example 1, except that the separator SP5 was used instead of the separator SP1, and evaluation was performed.

Example 6

A separator was manufactured in the same manner as in Example 1, except that inorganic particles LATP as a raw material, a polymeric binder PVB, and a cellulose nanofiber were mixed at a mass ratio of 84.8:15:0.2 to adjust a slurry, and then the obtained separator was used to manufacture a secondary battery in the same manner as in Example 1. Hereinafter, the separator is referred to as a separator SP6. Evaluation was performed in the same manner as in Example 1, except that the separator SP6 was used instead of the separator SP1.

Example 7

A separator was manufactured in the same manner as in Example 1, except that inorganic particles LATP as a raw material, a polymeric binder PVB, and a cellulose nanofiber as a fiber substance were mixed at a mass ratio of 70:15:15 to adjust a slurry, and then the obtained separator was used to manufacture a secondary battery in the same manner as in Example 1. Hereinafter, the separator is referred to as a separator SP7. Evaluation was performed in the same manner as in Example 1, except that the separator SP7 was used instead of the separator SP1.

Example 8

A separator was manufactured in the same manner as in Example 1, except that inorganic particles LATP as a raw material, a polymeric binder PVB, and a cellulose nanofiber as a fiber substance were mixed at a mass ratio of 55:15:30 to adjust a slurry, and then the obtained separator was used to manufacture a secondary battery in the same manner as in Example 1. Hereinafter, the separator is referred to as a separator SP8. Evaluation was performed in the same manner as in Example 1, except that the separator SP8 was used instead of the separator SP1.

Example 9

A separator was manufactured in the same manner as in Example 1, except that inorganic particles LATP as a raw material, a polymeric binder PVB, and a polyvinyl alcohol fiber (PVA) as a fiber substance were mixed at a mass ratio of 84.2:15:0.8 to adjust a slurry, and then the obtained separator was used to manufacture a secondary battery in the same manner as in Example 1. At this time, as the polyvinyl alcohol fiber (PVA), that having a molecular weight of 1,000,000 or more and an average fiber diameter of 15 nm was used. Hereinafter, the separator is referred to as a separator SP9. Evaluation was performed in the same manner as in Example 1, except that the separator SP9 was used instead of the separator SP1.

Example 10

A separator was manufactured in the same manner as in Example 1, except that inorganic particles LATP as a raw material, a polymeric binder PVB, and a polyvinyl alcohol fiber (PVA) as a fiber substance were mixed at a mass ratio of 70:15:15 to adjust a slurry, and then the obtained separator was used to manufacture a secondary battery in the same manner as in Example 1. At this time, as the polyvinyl alcohol fiber (PVA), that having a molecular weight of 1,000,000 or more and an average fiber diameter of 15 nm was used. Hereinafter, the separator is referred to as a separator SP10. Evaluation was performed in the same manner as in Example 1, except that the separator SP10 was used instead of the separator SP1.

Example 11

A separator was manufactured in the same manner as in Example 1, except that a cellulose nanofiber having an average fiber diameter of 5 nm was used as a fiber substance, and then the obtained separator was used to manufacture a secondary battery in the same manner as in Example 1. Hereinafter, the separator is referred to as a separator SP11. Evaluation was performed in the same manner as in Example 1, except that the separator SP11 was used instead of the separator SP1.

Example 12

A separator was manufactured in the same manner as in Example 3, except that a polyvinyl alcohol fiber (PVA) having an average fiber diameter of 5 nm was used as a fiber substance, and then the obtained separator was used to manufacture a secondary battery in the same manner as in Example 1. At this time, as the polyvinyl alcohol fiber (PVA), that having a molecular weight of 1,000,000 or more was used. Hereinafter, the separator is referred to as a separator SP12. Evaluation was performed in the same manner as in Example 1, except that the separator SP12 was used instead of the separator SP1.

Example 13

A separator was manufactured in the same manner as in Example 1, except that a mixture of a glass solid electrolyte LATP and alumina ($Al_2O_3$) was used as inorganic particles, and then the obtained separator was used to manufacture a secondary battery in the same manner as in Example 1. Hereinafter, the separator is referred to as a separator SP13. Evaluation was performed in the same manner as in Example 1, except that the separator SP13 was used instead of the separator SP1.

In the manufacture of the separator SP13, the mass ratio of LATP and alumina in inorganic particles was 50:50, and LATP particles, alumina particles, PVB as a polymeric binder, and a cellulose nanofiber as a fiber substance were mixed at a mass ratio of 42:42:15:1, to adjust a slurry, and then the separator SP13 was manufactured in the same manner as in Example 1. The mass ratio of LATP and alumina in the inorganic particles was evaluated as follows, using an X-ray diffraction device (X-ray powder diffraction; XRD). First, one of the manufactured secondary batteries was disassembled to collect the separator SP13, which was then dried well under a condition of 50° C. in the air. Next, a part of the separator SP13 was cut out to obtain a specimen. The size of the specimen was a square plate having a four-side length of 1 cm. The obtained specimen was set on a sample holder and measured. The mass ratio of LATP and alumina in the inorganic particles was estimated by performing a multiphase analysis by a Rietveld method on the obtained XRD. As a result, the mass ratio of LATP and alumina in the separator SP13 was 50:50. From the above, the mass ratio of the LATP particles, alumina, the polymeric binder, and the fiber substance was 42:42:15:1.

Example 14

A separator was manufactured in the same manner as in Example 1, except that a mixture of a glass solid electrolyte LATP and alumina was used as inorganic particles, and then the obtained separator was used to manufacture a secondary battery in the same manner as in Example 1. Hereinafter, the separator is referred to as a separator SP14. Evaluation was performed in the same manner as in Example 1, except that the separator SP14 was used instead of the separator SP1. The separator SP14 was manufactured in the same manner as in Example 1, except that the mass ratio of LATP and alumina in inorganic particles was 50:50, and LATP particles, alumina, polymeric binder PVB, and a cellulose nanofiber as a fiber substance were mixed at a mass ratio of 42.1:42.1:15:0.8, to adjust a slurry. As result of evaluating the obtained separator SP14 in the same manner as in Example 13, a mass fraction of the LATP particles, the alumina, the polymeric binder, and the fiber substance was 42.1:42.1:15:0.8 in order.

Example 15

A separator was manufactured in the same manner as in Example 1, except that a mixture of a glass solid electrolyte LATP and alumina was used as inorganic particles, and then the obtained separator was used to manufacture a secondary battery in the same manner as in Example 1. Hereinafter, the separator is referred to as a separator SP15. Evaluation was performed in the same manner as in Example 1, except that the separator SP15 was used instead of the separator SP1. The separator SP15 was manufactured in the same manner as in Example 1, except that the mass ratio of LATP and alumina in inorganic particles was 50:50, and LATP particles, alumina particles, polymeric binder PVB, and a cellulose nanofiber as a fiber substance were mixed at a mass ratio of 35:35:15:15, to adjust a slurry. As a result of evaluating the obtained separator SP15 in the same manner as in Example 13, a mass fraction of the LATP particles, the alumina, the PVB resin, and the cellulose nanofiber was 35:35:15:15 in order.

Example 16

A separator was manufactured in the same manner as in Example 1, except that inorganic particles LATP as a raw material, a polymeric binder PVB, and a cellulose nanofiber as a fiber substance were mixed at a mass ratio of 84.9:15:0.1 to adjust a slurry, and then the obtained separator was used to manufacture a secondary battery in the same manner as in Example 1. Hereinafter, the separator is referred to as a separator SP16. Evaluation was performed in the same manner as in Example 1, except that the separator SP16 was used instead of the separator SP1.

Example 17

A separator was manufactured in the same manner as in Example 1, except that inorganic particles LATP as a raw material, a polymeric binder PVB, and a cellulose nanofiber as a fiber substance were mixed at a mass ratio of 47:15:38 to adjust a slurry, and then the obtained separator was used to manufacture a secondary battery in the same manner as in Example 1. Hereinafter, the separator is referred to as a separator SP17. Evaluation was performed in the same manner as in Example 1, except that the separator SP17 was used instead of the separator SP1.

Example 18

A separator was manufactured in the same manner as in Example 1, except that alumina was used as inorganic particles, and then the obtained separator was used to manufacture a secondary battery in the same manner as in Example 1. Hereinafter, the separator is referred to as a separator SP18. Evaluation was performed in the same manner as in Example 1, except that the separator SP18 was used instead of the separator SP1.

Example 19

A separator was manufactured in the same manner as in Example 1, except that silica ($SiO_2$) was used as inorganic particles, and then the obtained separator was used to manufacture a secondary battery in the same manner as in Example 1. Hereinafter, the separator is referred to as a separator SP19. Evaluation was performed in the same manner as in Example 1, except that the separator SP19 was used instead of the separator SP1.

Example 20

A separator was manufactured in the same manner as in Example 1, except that polyvinylidene fluoride (PVdF) was used as a polymeric binder, and then the obtained separator was used to manufacture a secondary battery in the same manner as in Example 1. Hereinafter, the separator is referred to as a separator SP20. Evaluation was performed in the same manner as in Example 1, except that the separator SP20 was used instead of the separator SP1.

Example 21

A separator was manufactured in the same manner as in Example 1, except that inorganic particles LATP as a raw material, a polymeric binder PVB, and a cellulose nanofiber as a fiber substance were mixed at a mass ratio of 89:10:1 to adjust a slurry, and then the obtained separator was used to manufacture a secondary battery in the same manner as in Example 1. Hereinafter, the separator is referred to as a separator SP21. Evaluation was performed in the same manner as in Example 1, except that the separator SP21 was used instead of the separator SP1.

Example 22

A separator was manufactured in the same manner as in Example 1, except that inorganic particles LATP as a raw material, a polymeric binder PVB, and a polyvinyl alcohol fiber (PVA) as a fiber substance were mixed at a mass ratio of 89:10:1 to adjust a slurry, and then the obtained separator was used to manufacture a secondary battery in the same manner as in Example 1. At this time, as the polyvinyl alcohol fiber (PVA), that having a molecular weight of 1,000,000 or more and an average fiber diameter of 15 nm was used. Hereinafter, the separator is referred to as a separator SP22. The secondary battery was obtained in the same manner as in Example 1, except that the separator SP22 was used instead of the separator SP1, and evaluation was performed.

Example 23

A separator was manufactured in the same manner as in Example 1, except that inorganic particles LATP as a raw material, a polymeric binder PVB, and a cellulose nanofiber as a fiber substance were mixed at a mass ratio of 65:15:20 to adjust a slurry, and then the obtained separator was used to manufacture a secondary battery in the same manner as in Example 1. Hereinafter, the separator is referred to as a separator SP23. The secondary battery was obtained in the same manner as in Example 1, except that the separator SP23 was used instead of the separator SP1, and evaluation was performed.

Example 24

A separator was manufactured in the same manner as in Example 1, except that inorganic particles LATP as a raw material, a polymeric binder PVB, and a cellulose nanofiber as a fiber substance were mixed at a mass ratio of 84.2:15:0.8 to adjust a slurry, and then the obtained separator was used to manufacture a secondary battery in the same manner as in Example 1. Hereinafter, the separator is referred to as a separator SP24. Evaluation was performed in the same manner as in Example 1, except that the separator SP24 was used instead of the separator SP1.

Example 25

A separator was manufactured in the same manner as in Example 1, except that inorganic particles LATP as a raw material, a polymeric binder PVB, and a polyvinyl alcohol fiber (PVA) as a fiber substance were mixed at a mass ratio of 84.8:15:0.2 to adjust a slurry, and then the obtained separator was used to manufacture a secondary battery in the same manner as in Example 1. At this time, as the polyvinyl alcohol fiber (PVA), that having a molecular weight of 1,000,000 or more and an average fiber diameter of 15 nm was used. Hereinafter, the separator is referred to as a separator SP25. The secondary battery was obtained in the same manner as in Example 1, except that the separator SP25 was used instead of the separator SP1, and evaluation was performed.

Example 26

A separator was manufactured in the same manner as in Example 1, except that inorganic particles LATP as a raw material, a polymeric binder PVB, and a polyvinyl alcohol fiber (PVA) as a fiber substance were mixed at a mass ratio of 70:15:15 to adjust a slurry, and then the obtained separator was used to manufacture a secondary battery in the same manner as in Example 1. At this time, as the polyvinyl alcohol fiber (PVA), that having a molecular weight of 1,000,000 or more and an average fiber diameter of 15 nm was used. Hereinafter, the separator is referred to as a separator SP26. Evaluation was performed in the same manner as in Example 1, except that the separator SP26 was used instead of the separator SP1.

Example 27

A separator was manufactured in the same manner as in Example 1, except that a slurry adjusted by mixing inorganic particles LATP as a raw material, a polymeric binder PVB, and a polyvinyl alcohol fiber (PVA) as a fiber substance at a mass ratio of 55:15:30 was used, and then the obtained separator was used to manufacture a secondary battery in the same manner as in Example 1. At this time, as the polyvinyl alcohol fiber (PVA), that having a molecular weight of 1,000,000 or more and an average fiber diameter of 15 nm was used. Hereinafter, the separator is referred to as a separator SP8. Evaluation was performed in the same manner as in Example 1, except that the separator SP27 was used instead of the separator SP1.

Example 28

A separator was manufactured in the same manner as in Example 1, except that polyacrylic acid was used as a fiber substance, and then the obtained separator was used to manufacture a secondary battery in the same manner as in Example 1. At this time, as the polyacrylic acid, that having a molecular weight of 1,000,000 or more and an average fiber diameter of 15 nm was used. Hereinafter, the separator is referred to as a separator SP28. Evaluation was performed in the same manner as in Example 1, except that the separator SP28 was used instead of the separator SP1.

Example 29

A separator was manufactured in the same manner as in Example 1, except that a cellulose fiber having an average fiber diameter of 200 nm was used as a fiber substance. Hereinafter, the separator is referred to as a separator SP29. The secondary battery was obtained in the same manner as in Example 1, except that the separator SP29 was used instead of the separator SP1, and evaluation was performed.

Comparative Example 1

A secondary battery was obtained in the same manner as in Example 1, except that a cellulose nonwoven fabric was used instead of the separator SP1, and evaluation was performed. A thickness of the cellulose nonwoven fabric was 20 μm. Hereinafter, the separator is referred to as a separator SP30.

Comparative Example 2

A separator SP31 which was manufactured in the same manner as the separator SP1 except that the fiber substance is not included, was used instead of the separator SP1. For the separator SP31, a slurry was adjusted so that a mass ratio of LATP particles and a PVB resin was 85:15. The secondary battery was obtained in the same manner as in Example 1, except that the separator SP31 was used instead of the separator SP1, and evaluation was performed.

Comparative Example 3

A separator SP32 which was manufactured in the following method was used instead of the separator SP1. The separator SP32 was manufactured in the same manner as the separator SP1, except that a slurry was adjusted so that, a mass ratio of LATP particles, a PVB resin, and polyvinyl alcohol fiber (PVA) was 25:15:60. The secondary battery was obtained in the same manner as in Example 1, except that the separator SP32 was used instead of the separator SP1, and evaluation was performed.

Comparative Example 4

A separator was manufactured in the same manner as in Comparative Example 3, except that alumina particles were used as inorganic particles instead of the glass solid electrolyte LATP ($Li_{1.5}Al_{0.5}Ti_{1.5}(PO_4)_3$) particles and cellulose nanofiber whose average fiber diameter is 15 nm was used as fiber substance. Hereinafter, the separator is referred to as a separator SP33. The secondary battery was obtained in the same manner as in Example 1, except that the separator SP33 was used instead of the separator SP1, and evaluation was performed.

[Tables 1 to 4]

TABLE 1

| | | Separator | | | | | | |
|---|---|---|---|---|---|---|---|---|
| | | Inorganic particles | | Polymeric binder | | Fiber substance | | |
| | Abbreviation | Kind | Mass ratio [%] | Kind | Mass ratio [%] | Kind | Fiber diameter [nm] | Mass ratio [%] |
| Example 1 | SP1 | LATP | 84 | PVB | 15 | Cellulose nanofiber | 15 | 1 |
| Example 2 | SP2 | LATP | 84 | PVB | 15 | Cellulose nanofiber | 15 | 1 |
| Example 3 | SP3 | LATP | 84 | PVB | 15 | Polyvinyl alcohol | 15 | 1 |
| Example 4 | SP4 | LATP | 84 | PVB | 15 | Polyvinyl alcohol 50% + polyacrylic acid 50% | 15 | 1 |
| Example 5 | SP5 | LATP | 84.2 | PVB | 15 | Cellulose nanofiber | 15 | 0.8 |
| Example 6 | SP6 | LATP | 84.8 | PVB | 15 | Cellulose nanofiber | 15 | 0.2 |
| Example 7 | SP7 | LATP | 70 | PVB | 15 | Cellulose nanofiber | 15 | 15 |
| Example 8 | SP8 | LATP | 55 | PVB | 15 | Cellulose nanofiber | 15 | 30 |
| Example 9 | SP9 | LATP | 84.2 | PVB | 15 | Polyvinyl alcohol | 15 | 0.8 |
| Example 10 | SP10 | LATP | 70 | PVB | 15 | Polyvinyl alcohol | 15 | 15 |
| Example 11 | SP11 | LATP | 84 | PVB | 15 | Cellulose nanofiber | 5 | 1 |
| Example 12 | SP12 | LATP | 84 | PVB | 15 | Polyvinyl alcohol | 5 | 1 |
| Example 13 | SP13 | LATP 50% + alumina ($Al_2O_3$) 50% | 84 | PVB | 15 | Cellulose nanofiber | 15 | 1 |
| Example 14 | SP14 | LATP 50% + alumina ($Al_2O_3$) 50% | 84.2 | PVB | 15 | Cellulose nanofiber | 15 | 0.8 |
| Example 15 | SP15 | LATP 50% + alumina ($Al_2O_3$) 50% | 70 | PVB | 15 | Cellulose nanofiber | 15 | 15 |

TABLE 1-continued

| | | Separator | | | | | | |
|---|---|---|---|---|---|---|---|---|
| | | Inorganic particles | | Polymeric binder | | Fiber substance | | |
| | Abbreviation | Kind | Mass ratio [%] | Kind | Mass ratio [%] | Kind | Fiber diameter [nm] | Mass ratio [%] |
| Example 16 | SP16 | LATP | 84.9 | PVB | 15 | Cellulose nanofiber | 15 | 0.1 |
| Example 17 | SP17 | LATP | 47 | PVB | 15 | Cellulose nanofiber | 15 | 38 |
| Example 18 | SP18 | Alumina ($Al_2O_3$) | 84 | PVB | 15 | Cellulose nanofiber | 15 | 1 |
| Example 19 | SP19 | Silica ($SiO_2$) | 84 | PVB | 15 | Cellulose nanofiber | 15 | 1 |
| Example 20 | SP20 | LATP | 84 | PVdF | 15 | Cellulose nanofiber | 15 | 1 |
| Example 21 | SP21 | LATP | 89 | PVB | 10 | Cellulose nanofiber | 15 | 1 |
| Example 22 | SP22 | LATP | 89 | PVB | 10 | Polyvinyl alcohol | 15 | 1 |
| Example 23 | SP23 | LATP | 65 | PVB | 15 | Cellulose nanofiber | 15 | 20 |
| Example 24 | SP24 | LATP | 84.2 | PVB | 15 | Polyvinyl alcohol | 15 | 0.8 |
| Example 25 | SP25 | LATP | 84.8 | PVB | 15 | Polyvinyl alcohol | 15 | 0.2 |
| Example 26 | SP26 | LATP | 70 | PVB | 15 | Polyvinyl alcohol | 15 | 15 |
| Example 27 | SP27 | LATP | 55 | PVB | 15 | Polyvinyl alcohol | 15 | 30 |
| Example 28 | SP28 | LATP | 84 | PVB | 15 | Polyacrylic acid | 15 | 1 |
| Example 29 | SP29 | LATP | 84 | PVB | 15 | Cellulose fiber | 200 | 1 |

TABLE 2

| | | Separator | | | | | | |
|---|---|---|---|---|---|---|---|---|
| | | Inorganic particles | | Polymeric binder | | Fiber substance | | |
| | Abbreviation | Kind | Mass ratio [%] | Kind | Mass ratio [%] | Kind | Fiber diameter [nm] | Mass ratio [%] |
| Comparative Example 1 | SP30 | — | — | — | — | — | — | — |
| Comparative Example 2 | SP31 | LATP | 85 | PVB | 15 | — | — | — |
| Comparative Example 3 | SP32 | LATP | 25 | PVB | 15 | Polyvinyl alcohol | 15 | 60 |
| Comparative Example 4 | SP33 | Alumina ($Al_2O_3$) | 25 | PVB | 15 | Cellulose nanofiber | 15 | 60 |

TABLE 3

| | Secondary battery performance | |
|---|---|---|
| | Value of resistance for 10 seconds [Ω] | Charge/discharge efficiency [%] |
| Example 1 | 120 | 94 |
| Example 2 | 120 | 94 |
| Example 3 | 120 | 94 |
| Example 4 | 120 | 94 |
| Example 5 | 150 | 94 |
| Example 6 | 200 | 94 |
| Example 7 | 120 | 89 |
| Example 8 | 120 | 85 |
| Example 9 | 150 | 94 |
| Example 10 | 120 | 89 |
| Example 11 | 120 | 94 |
| Example 12 | 120 | 94 |
| Example 13 | 120 | 94 |
| Example 14 | 150 | 94 |
| Example 15 | 120 | 89 |
| Example 16 | 330 | 94 |
| Example 17 | 120 | 82 |
| Example 18 | 120 | 94 |
| Example 19 | 120 | 94 |
| Example 20 | 120 | 94 |
| Example 21 | 120 | 94 |
| Example 22 | 120 | 94 |
| Example 23 | 120 | 89 |
| Example 24 | 150 | 94 |
| Example 25 | 200 | 94 |
| Example 26 | 120 | 90 |
| Example 27 | 120 | 85 |
| Example 28 | 120 | 94 |
| Example 29 | 210 | 81 |

TABLE 4

| | Secondary battery performance | |
|---|---|---|
| | Value of resistance for 10 seconds [Ω] | Charge/discharge efficiency [%] |
| Comparative Example 1 | 90 | 70 |
| Comparative Example 2 | 630 | 78 |
| Comparative Example 3 | 90 | 70 |
| Comparative Example 4 | 90 | 70 |

In Table 1 and Table 2 above, in the columns labeled "abbreviation", "Inorganic particles", "Polymeric binder", and "Fiber substance" in the column labeled "Separator", the abbreviation of each separator, for example, SP1 is indicated, and the kinds of materials used as the inorganic particles, the polymeric binder, and the fiber substance are described. Further, in the right column labeled "Mass ratio (%)" in each column labeled "Inorganic particles", "Polymeric binder", and "Fiber substance", a mass ratio of each material in the separator is described as a percentage.

In Table 3 and Table 4, in the column labeled "Resistance value for 10 seconds [Ω]" in the column labeled "Secondary battery performance", resistance values which were obtained by discharge for 10 seconds after 51 cycles of the charge/discharge test, are described. In the column labeled "Charge/discharge efficiency (%)", values obtained by dividing a discharge capacity after 50 cycles of the charge/discharge test by a charge capacity, are described.

As shown in Table 3, the secondary batteries according to Examples 1 to 29 realized a high charge/discharge efficiency and a low value of resistance for 10 seconds, and achieved both a long life and a low resistance. On the other hand, as shown in Table 4, the secondary batteries according to Comparative Examples 1 to 4 were not able to achieve both a long life and a low resistance. This is presumed to be due to the fact that the separator did not include the inorganic particles and the polymeric binder in Comparative Example 1, and thus, passing through of water between a positive electrode and a negative electrode was not able to be suppressed, and decomposition of water occurred in a negative electrode. Further, the secondary battery according to Comparative Example 2 in which a fiber substance was not mixed had a clearly higher value of resistance for 10 seconds and a lower charge/discharge efficiency than that of Example 1. In Comparative Examples 3 and 4, a weight ratio of the fiber substance was more than 40 mass %, whereby an amount of the inorganic particles in the separator was decreased, and the mechanical strength of the separator was decreased to decrease the charge/discharge efficiency. From the above, it was confirmed that when the separator includes a fiber substance, the secondary battery has a low resistance. This is presumed to be due to the fact that 0.1 mass % or more and 40 mass % or less of the fiber substance was added to the separator, whereby an aqueous electrolyte was taken in between the fiber substances included in the separator. The separators including those of Examples 1 and 8 in which the mass ratio of the fiber substance in the separator was in a range of 0.5 mass % or more and 30 mass % or less, had a lower resistance for 10 seconds or a higher charge/discharge efficiency than the separator of Examples 16 and 17. Thus, it is considered that the mass ratio of the fiber substance in the separator is preferably in a range of 0.1 mass % or more and 40 mass % or less, and more preferably in a range of 0.5 mass % or more and 30 mass % or less.

In Examples 13, 18, and 19 in which the kind of inorganic particles of the separator was different from that of Example 1, and Example 20 in which the polymeric binder was different from that of Example 1 also, the charge/discharge efficiency and the value of resistance for 10 seconds were in a same level as in Example 1. Further, in Examples 21 and 22 in which the ratio of the inorganic particles and the binder in the separator was different also, the charge/discharge efficiency at almost the same level as in Example 1 and a lower resistance for 10 seconds than that of Example 1 were confirmed.

When the average fiber diameter of the fiber substance included in the separator was 5 nm, the charge/discharge efficiency and the value of resistance for 10 seconds were at the same level as the separator of Example 1. On the other hand, the average fiber diameter of the fiber substance included in the separator was 200 nm, the value of resistance for 10 seconds was higher than that of Example 1. This shows that when the average fiber diameter of the fiber substance is 100 nm or less, the resistance is decreased by swelling of the separator, and the aqueous electrolyte is effectively taken in between the fiber substances.

When the separator having a configuration according to at least one embodiment described above is used in a secondary battery, the electrolyte is taken in between the fiber substances, and ion conductivity is improved, thereby lowering the resistance of the secondary battery. Therefore, the secondary battery according to at least one embodiment including the separator as such can realize excellent charge/discharge efficiency, that is, a long life.

Though some embodiments of the present invention have been described, these embodiments are provided by way of example, and are not intended to limit the scope of the present invention. These novel embodiments can be practiced in other various forms, and various omissions, replacements, and changes can be made without departing from the gist of the present invention. These embodiments and the modification thereof are included in the scope and gist of the invention, and also included in the invention described in the claims and the equivalent scope thereof.

What is claimed is:

1. A secondary battery comprising:
a positive electrode containing a positive electrode active material;
a negative electrode containing a negative electrode active material;
a separator disposed at least between the positive electrode and the negative electrode; and
an aqueous electrolyte, wherein
the separator comprises an inorganic particle layer including an inorganic particle, a polymeric binder and a fiber substance,
the fiber substance is hydrophilic and a mass ratio of the fiber substance with respect to a total mass of the inorganic particle, the polymeric binder and the fiber substance is 0.1 mass % or more and 40 mass % or less, and
a mass ratio of the polymeric binder with respect to a total mass of the inorganic particle, the polymeric binder and the fiber substance is 5 mass % or more and 30 mass % or less.

2. The secondary battery according to claim 1, wherein the mass ratio of the fiber substance is 0.5 mass % or more and 30 mass % or less.

3. The secondary battery according to claim 1, wherein an average fiber diameter of the fiber substance is 1 nm or more and 100 nm or less.

4. The secondary battery according to claim 1, wherein the separator further comprises a porous free-standing film disposed on a main surface of the inorganic particle layer.

5. The secondary battery according to claim 1, wherein the inorganic particle include at least one of NASICON type LATP ($Li_{1+x}Al_xTi_{2-x}(PO_4)_3$), $Li_{1+x}Al_xGe_{2-x}(PO_4)_3$, $Li_{1+x}Al_xZr_{2-x}(PO_4)_3$ ($0.1 \leq x \leq 0.5$), amorphous LIPON ($Li_{2.9}PO_{3.3}N_{0.46}$), or garnet type LLZ ($Li_7La_3Zr_2O_{12}$).

6. The secondary battery according to claim 1, wherein the polymeric binder includes a part composed of a monomer unit comprising a hydrocarbon having a functional group containing at least one element selected from the group consisting of oxygen (O), sulfur (S), nitrogen (N), and fluorine (F), and a ratio of the part composed of the monomer unit is 70 mol % or more.

7. The secondary battery according to claim 1, wherein the negative electrode active material includes a compound having a lithium ion adsorption/desorption potential of 1 V or more and 3 V or less (vs. Li/Li$^+$) as a potential based on metal lithium.

8. The secondary battery according to claim 1, wherein the positive electrode active material includes a compound having a lithium ion adsorption/desorption potential of 2.5 V or more and 5.5 V or less (vs. Li/Li$^+$) as a potential based on metal lithium.

9. A battery pack comprising the secondary battery according to claim 1.

10. The battery pack according to claim 9, further comprising an external terminal for energization and a protection circuit.

11. The battery pack according to claim 9, comprising a plurality of the secondary batteries, wherein the plurality of secondary batteries are electrically connected in series, in parallel, or in combination of series and parallel.

12. A vehicle comprising the battery pack according to claim 9.

13. A stationary power supply comprising the battery pack according to claim 9.

14. The secondary battery according to claim 1, wherein the fiber substance is selected from the group consisting of cellulose fibers, polysaccharides, and polyvinyl alcohol.

* * * * *